US012648549B2

(12) United States Patent
Fox

(10) Patent No.: US 12,648,549 B2
(45) Date of Patent: Jun. 9, 2026

(54) FISHING LURE LINE ATTACHMENT SYSTEM

(71) Applicant: William Fox, New Richmond, OH (US)

(72) Inventor: William Fox, New Richmond, OH (US)

( * ) Notice: Subject to any disclaimer, the term of this patent is extended or adjusted under 35 U.S.C. 154(b) by 0 days.

(21) Appl. No.: 19/074,643

(22) Filed: Mar. 10, 2025

(65) Prior Publication Data

US 2025/0204505 A1    Jun. 26, 2025

Related U.S. Application Data

(63) Continuation-in-part of application No. 18/309,821, filed on Apr. 30, 2023, now abandoned, which is a continuation-in-part of application No. 17/400,690, filed on Aug. 12, 2021, now Pat. No. 11,779,001.

(51) Int. Cl.
A01K 85/00 (2006.01)
A01K 85/02 (2006.01)
A01K 85/16 (2006.01)

(52) U.S. Cl.
CPC ........ A01K 85/1867 (2022.02); A01K 85/024 (2022.02); A01K 85/16 (2013.01)

(58) Field of Classification Search
CPC .. A01K 85/1867; A01K 85/024; A01K 85/16; A01K 85/00; A01K 85/02; A01K 85/022; A01K 85/1851; A01K 85/1857; A01K 85/1871; A01K 85/1873; A01K 85/1883; A01K 83/066; A01K 91/03; A01K 91/04; A01K 91/047
USPC ......... 43/42, 42.36, 42.08; 24/135 R, 135 A, 24/136 R, 136 L, 136 B
See application file for complete search history.

(56) References Cited

U.S. PATENT DOCUMENTS

| | | | | |
|---|---|---|---|---|
| 3,898,760 A | * | 8/1975 | Klein | A01K 91/04 24/129 R |
| 4,300,303 A | * | 11/1981 | Hutson | A01K 87/00 43/43.1 |
| 4,472,903 A | * | 9/1984 | Hutson | A01K 95/00 43/44.93 |
| 4,777,757 A | * | 10/1988 | de Marees van Swinderen | A01K 85/01 D22/128 |
| 5,207,016 A | * | 5/1993 | Pate | A01K 85/00 43/42.35 |
| 7,861,457 B2 | * | 1/2011 | Blette | A01K 91/047 43/43.1 |

(Continued)

*Primary Examiner* — Timothy D Collins
*Assistant Examiner* — Maria E Graber
(74) *Attorney, Agent, or Firm* — Jenei LLC

(57) ABSTRACT

The present invention discloses a fishing lure for knotless line attachment. The fishing lure comprises a nose portion and a tail portion configured to be assembled together. The nose portion includes a proximal hole sized to receive a fishing line. A funnel is formed in the tail portion, and aligned with the proximal hole to guide the fishing line into a groove formed in the tail portion. The groove extends from a top of the tail portion to a gap defined between the nose portion and the tail portion when assembled. A coupling mechanism, such as a threaded engagement, enables rotation or movement of the nose portion relative to the tail portion to securely clamp the fishing line without requiring a knot. The lure further comprises radial grippers to engage the line, wings to guide the line, and an optional flexible weed guard to reduce snagging on underwater debris.

8 Claims, 27 Drawing Sheets

(56) References Cited

U.S. PATENT DOCUMENTS

| | | | |
|---|---|---|---|
| 8,402,687 B1 * | 3/2013 | Jarrell .................... | A01K 85/00 |
| | | | 43/42.28 |
| 9,301,514 B2 * | 4/2016 | Pearcy ................... | A01K 91/03 |
| 10,264,775 B2 * | 4/2019 | Brown, Sr. ............ | A01K 95/02 |
| 11,653,638 B2 * | 5/2023 | Fox ......................... | F16B 2/005 |
| | | | 43/44.89 |
| 12,369,573 B2 * | 7/2025 | Carlson ................. | A01K 93/00 |
| 2017/0150703 A1 * | 6/2017 | Fenton ................. | A01K 91/04 |
| 2019/0014761 A1 * | 1/2019 | Rosher .................. | A01K 85/18 |

* cited by examiner

FISHING LURE LINE ATTACHMENT SYSTEM

CROSS-REFERENCE TO RELATED APPLICATIONS

The present application is a continuation-in-part of U.S. patent application Ser. No. 18/309,821, entitled "FISHING LURE LINE ATTACHMENT SYSTEM", filed Apr. 30, 2023, which is a continuation-in-part of U.S. patent application Ser. No. 17/400,690, entitled "FISHING LURE LINE ATTACHMENT SYSTEM", filed Aug. 12, 2021, which are hereby expressly incorporated by reference herein for all purposes.

TECHNICAL FIELD

The present disclosure relates generally to a fishing lure, and more particularly, to a fishing lure with a fishing line attachment for providing a user with the ability to attach the fishing line relatively easily and quickly to the lure without having to tie a knot, and without additional or intermediate structures.

BACKGROUND

Fishing is a worldwide recreational and sustenance activity, with professional and amateur competitions quite common. Many anglers prefer to use artificial lures versus live bait. A lure is generally any type of artificial fishing bait which is designed to attract a fish's attention. Consequently, countless artificial bait lures and attachments have been developed to attract and catch fish, and numerous lures and attachments have been adapted to mimic the appearance and movement of common fish prey.

All these attachments are required to connect to a fishing line, which is in turn connected to a fishing pole used for casting and retrieving the lure and fish. One conventional method of connecting fishing line to a fishing lure for example, involves utilization of one or more intermediate connectors. One method of connecting lures involves providing a lure body with an eyelet. The free end of the fishing line is passed through the eyelet and a knot is manually tied using a variety of fishing knots, some of which are very complicated, time consuming and inefficient, and especially so if an angler is aging, young, inexperienced, has poor dexterity or diminished eyesight, and especially in low light conditions or during unstable situations that are typical when fishing, kayaking, and boating.

During fish retrieval, it is common for fishing line to break or come untied at the point of attachment to the lure, thereby losing the fish. So, it is further desirable to have an attachment means that is capable of reliably holding the fighting fish without losing it due to those reasons.

Further, during many competitive fishing events, the speed of attaching lures is important, as is the security of the attachment means.

Therefore, there exists a need for a fishing lure with a fishing line attachment structure for providing a user with the ability to attach the fishing line relatively easily and quickly to the lure without having to tie a knot and without extraneous intermediate structures.

Also, when fishing in many venues, vegetation, rocks, logs and other debris are present in the water, which also provides cover for the hiding fish, and entices anglers to fish there. However, the vegetation also causes a snag potential during lure retrieval, which poses a hazard for losing lures due to snags, and adding time to unsnag the lure, ultimately resulting in fewer fish catches.

Therefore, there also exists a need for a deflection guard to prevent hooks from snagging vegetation, rocks, and other debris in the water, to enable smooth trouble-free retrieval without delays and lost lures. Yet this weed and debris guard must not inhibit the hook from catching a fish's mouth.

During fishing, it is also common for some fish to swallow the hook too deeply, thereby making removal difficult without harming the fish, and/or taking a long time to remove the hook from deep inside a fish's mouth, gills, or gut.

Therefore, it is also desirable to provide a means on the lure to prevent the fish from swallowing the hook too deeply, such that removal of the hook is difficult or harmful to the fish, both in terms of damage to the fish's mouth and internal organs and reducing the duration of time the fish must be kept out of the water during hook removal, especially if releasing the fish to the water when practicing "catch and release".

SUMMARY OF THE INVENTION

The present invention discloses a fishing lure and a fishing line attachment system. The present invention discloses a fishing lure. The fishing lure comprises a head having an aperture. The aperture is configured to receive a fishing line therethrough. The fishing lure further comprises a body structure having a channel to enable passage of the fishing line from the head through a longitudinal axis of the body structure and extend beyond the body structure. The head is configured to lock with the body structure while locking the fishline therein.

The channel extends from a first end portion of the body structure to a second end portion of the body structure. The body structure comprises a body, a neck extending from a body and a jaw portion extending from the neck. The channel, the body and the jaw portion extending from the neck together define the fishing line attachment assembly. The jaw portion comprises a plurality of flared jaws. Each jaw is separated from the adjacent slot to form a flared open configuration. The body comprises a plurality of first ridges over an exterior surface of the body and the neck comprises a plurality of external screw threads. The head comprises a plurality of internal screw threads adapted to screw and lock with the neck comprising external screw threads. The jaw portion is configured to move from the open configuration to a closed configuration when the head screwed over the neck presses the jaws towards the axis of the body, which clenches the fishing line passing therethrough, thereby fastening the fishing line to the fishing lure. The head further comprises a plurality of second ridges over an exterior surface of the head.

The fishing lure further comprises a flexible weed guard mounted over the body to attract fish. The fishing lure further comprises a fishing hook structure integrally configured at the second end portion of the body structure. The fishing hook structure comprises one or more sleeves formed at an area proximal to the second end portion of the body to receive a fishing hook including a bait accessory.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Figure 1:
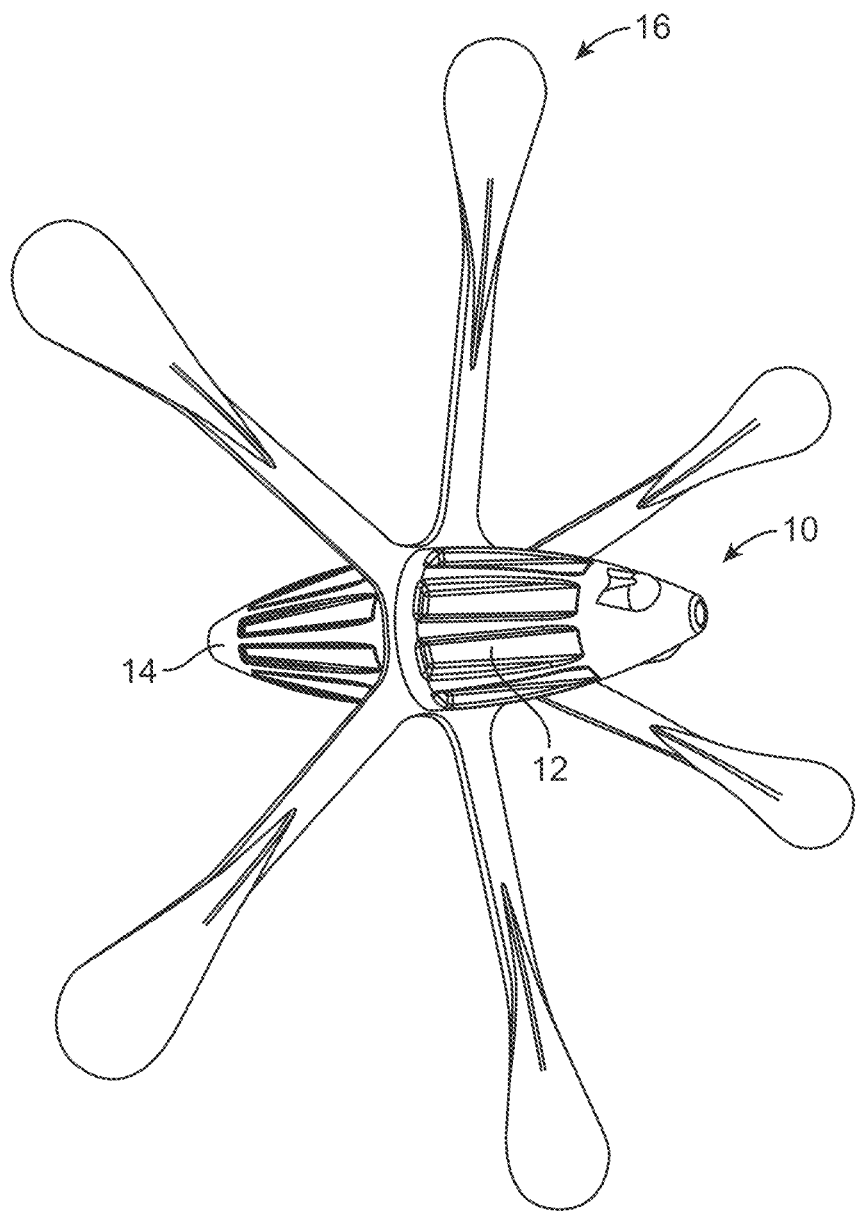
FIG. 1 exemplarily illustrates a perspective view of a fishing lure, according to an embodiment of the present invention.

FIG. 1 exemplarily illustrates a perspective view of a fishing lure 10, according to an embodiment of the present invention. The lure 10 comprises a head 12, a body structure 14 and at least one weed guard 16 disposed over the body structure 14. The fishing lure 10 may be made of any suitable material or composition such as wood, plastic, silicone, rubber, metal, cork, carbon fiber, and other suitable materials. The fishing lure shown in the figures is meant to be an example of a fishing accessory and does not limit the fishing lure to that specifically shown fishing accessory. For example, a fishing lure shown could be replaced with a lure or bobber of different sizes, shapes (e.g., spherical, oblong, teardrop, football, or irregular), or materials (balloon, hollow spherical plastic, polystyrene, cork, foam, yarn, neoprene, silicone, or other floating material). Alternatively, the fishing lure could be replaced by a weight. Weights may be, for example, magnets, metal (e.g., lead), sand, or any material that would sink in water. In one or more embodiments, the at least one weed guard 16 is also a bite depth control. In one or more embodiments, the weed guard and bite depth control 16 is made of a plastic or plastic film. Other suitable materials include silicone alloys, magnesium alloys, coated paper products, lead, iron, steel, and brass. Ideally this material will be water resistant.

The head 12 defines a female connector, or a first connector, and the body structure 14 defines a male connector, or a second connector. The first connector is configured to lock with the second connector while a fishing line 44 (shown in FIG. 6) passes through a longitudinal axis of the body structure 14. The fishing line 44 may be of any suitable material, including traditional monofilament, braided line, metal cable, or even semi-rigid wire as may be desired.

Figure 2:
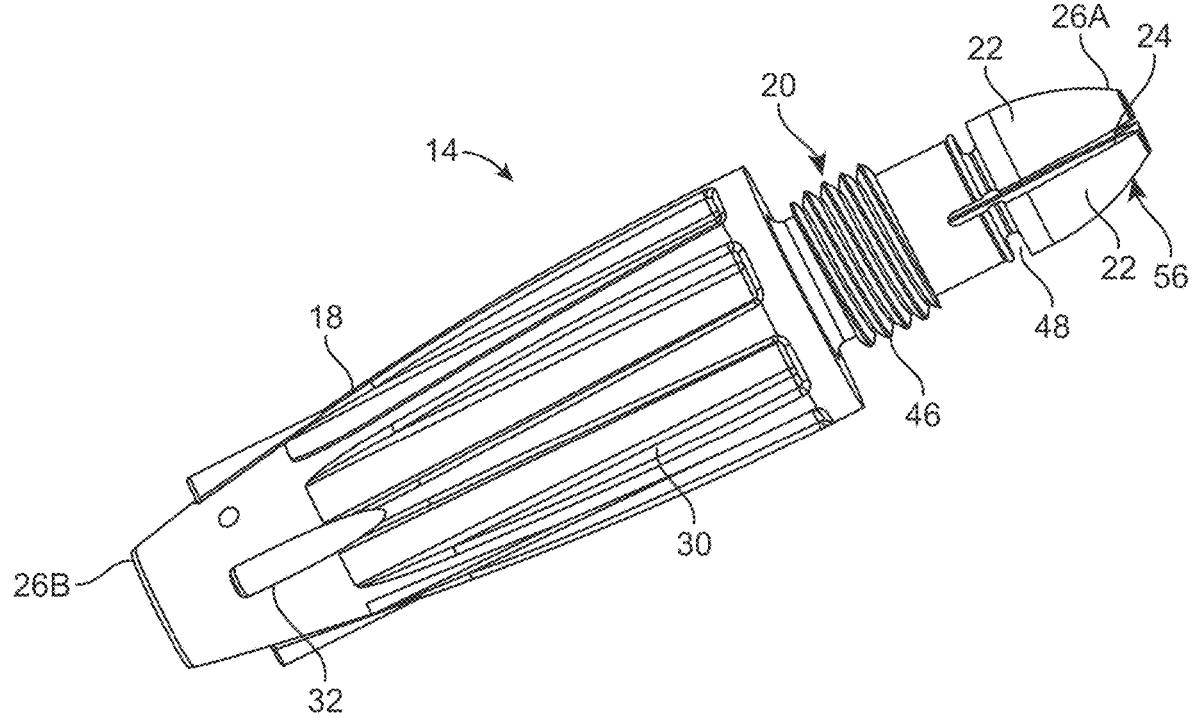
FIG. 2 exemplarily illustrates a perspective view of a body structure of FIG. 1, according to an embodiment of the present invention.
Figure 3:
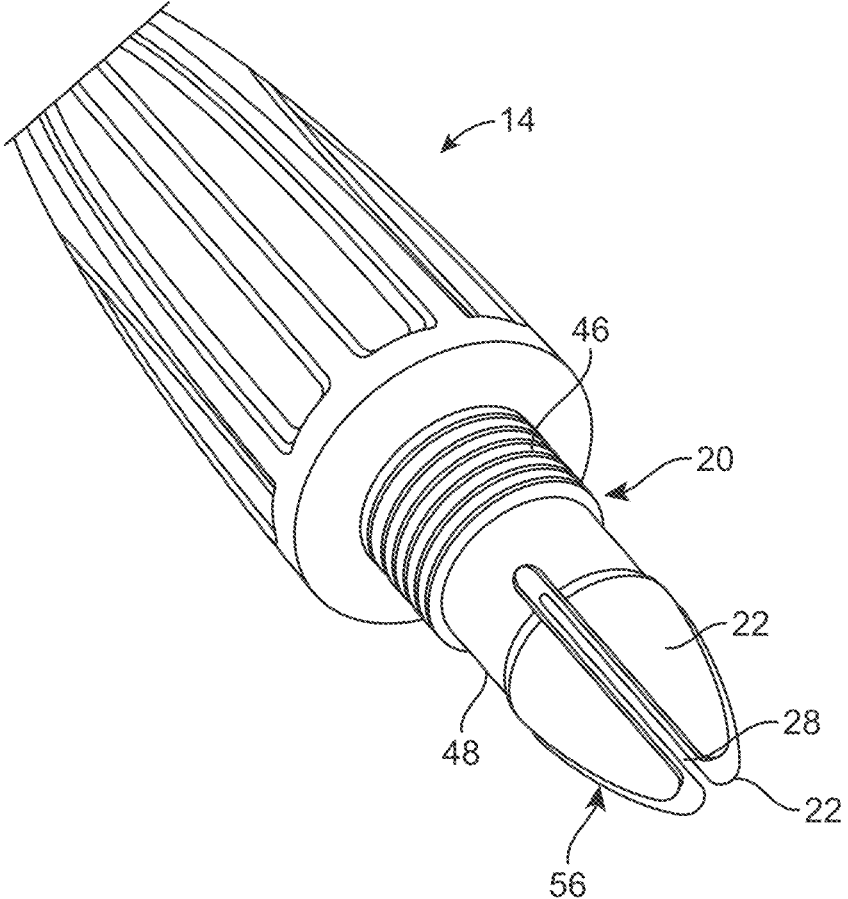
FIG. 3 exemplarily illustrates another perspective view of the body structure of FIG. 1.

Referring to FIG. 2 and FIG. 3, the body structure 14 comprises a first end portion 26A and a second end portion 26B opposite to the first end portion 26A. A channel 28 extends from the first end portion 26A and terminates at the second end portion 26B. The body structure 14 comprises a body 18, a neck 20 extending from the body 18 and a jaw portion 56 extending from the neck 20. The jaw portion 56 comprises a plurality of flared jaws 22. Each jaw 22 is separated from the adjacent slot 24 to form a flared open configuration. The neck 20 comprises external screw threads 46. The external screw threads 46 is configured on at least a portion of the longitudinal extent of the neck 20. The external threads 46 may extend along the entire longitudinal extent of the neck 20, or along only a portion of the neck 20. The external threads 46 preferably terminate substantially at the lower or bottom end of the neck 46.

The channel 28, the body 18 and the jaw portion 56 extending from the neck 20 together define a fishing line attachment assembly. In one embodiment, the body 18 may be a neutral or negative buoyancy so as to allow the entire assembly to be fully submerged in the water. The body 10 may be smooth or textured and may be plain or contain a design.

The body 18 further comprises a plurality of first ridges 30 over an exterior surface of the body 18. The lure 10 further comprises a fishing hook structure integrally configured at the second end portion 26B of the body structure 14. The fishing hook structure comprises one or more sleeves 32 formed at an area proximal to the second end portion 26B of the body 18.

Figure 4:
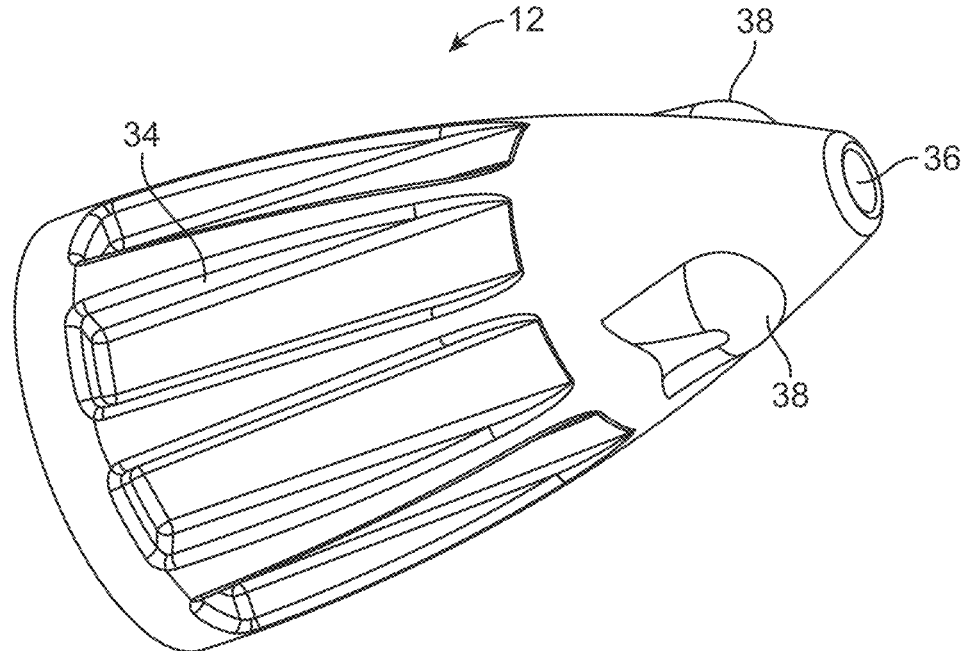
FIG. 4 exemplarily illustrates a perspective view of a head of FIG. 1.

Referring to FIG. 4, the head 12 comprises a plurality of second ridges 34 over an exterior surface of the head 12. The head 12 further comprises an aperture 36 to receive the fishing line 44 therethrough. The head 12 further comprises at least two protrusions 38 configured to mimic a structure of an eye of insects. The fishing lure 10 further comprises a snap-on mechanism 48 at the neck 20. The head 12 is configured to snap-fit over the neck 20 of the lure 10.

Figure 5:
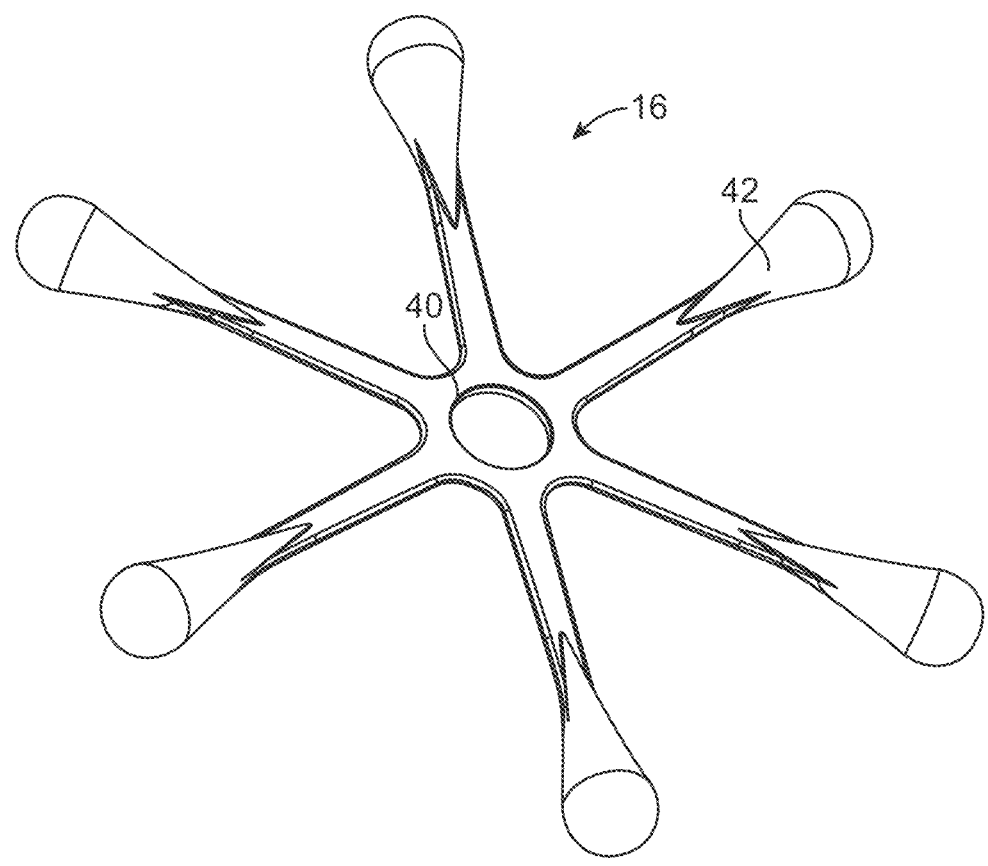
FIG. 5 exemplarily illustrates a perspective view of a weed guard of FIG. 1.

Referring to FIG. 5, the weed guard 16 is a flexible weed guard 16. The weed guard 16 comprises a ring structure 40 and a plurality of legs 42 extends from the ring structure 40. The flexible weed guard 16 mounted over the body 18 to attract fish. The weed guard 16 further helps to prevent tangling with weeds.

Referring to FIG. 6 to FIG. 9, the fishing line 44 is received through the aperture 36 of the head 12. Then, the fishing line 44 is passed through the channel 28 of the body structure 14 to exit out of the body structure 14 via the second end portion 26B. The head 12 further comprises internal screw threads 54. The internal screw threads 54 are adapted to screw and lock with the neck 20 comprising external screw threads 46.

When the head 12 is screwed over the neck 20, the plurality of jaws 22 moves from the open configuration to the closed configuration. In the open configuration, the plurality of jaws 22 is flared, which keeps the channel 28 open to receive the fishing line 44 passing through the head 12. In the closed configuration, the plurality of jaws 22 are moved towards one another which makes each jaw 22 lie close to the adjacent haw 22. Further, the jaws 22 are pressed towards the axis of the body structure 14 by the head 12 when the head 12 is screwed over the neck 20, which at least partially reduces the diameter of the channel 28. This makes the jaw portion 56 to clinch the fishing line 44 and secure the fishing line 44 to the lure 10. The fishing line 44 may be of any suitable material, including traditional monofilament, braided line, metal cable, or even semi-rigid wire as may be desired.

Figure 6:
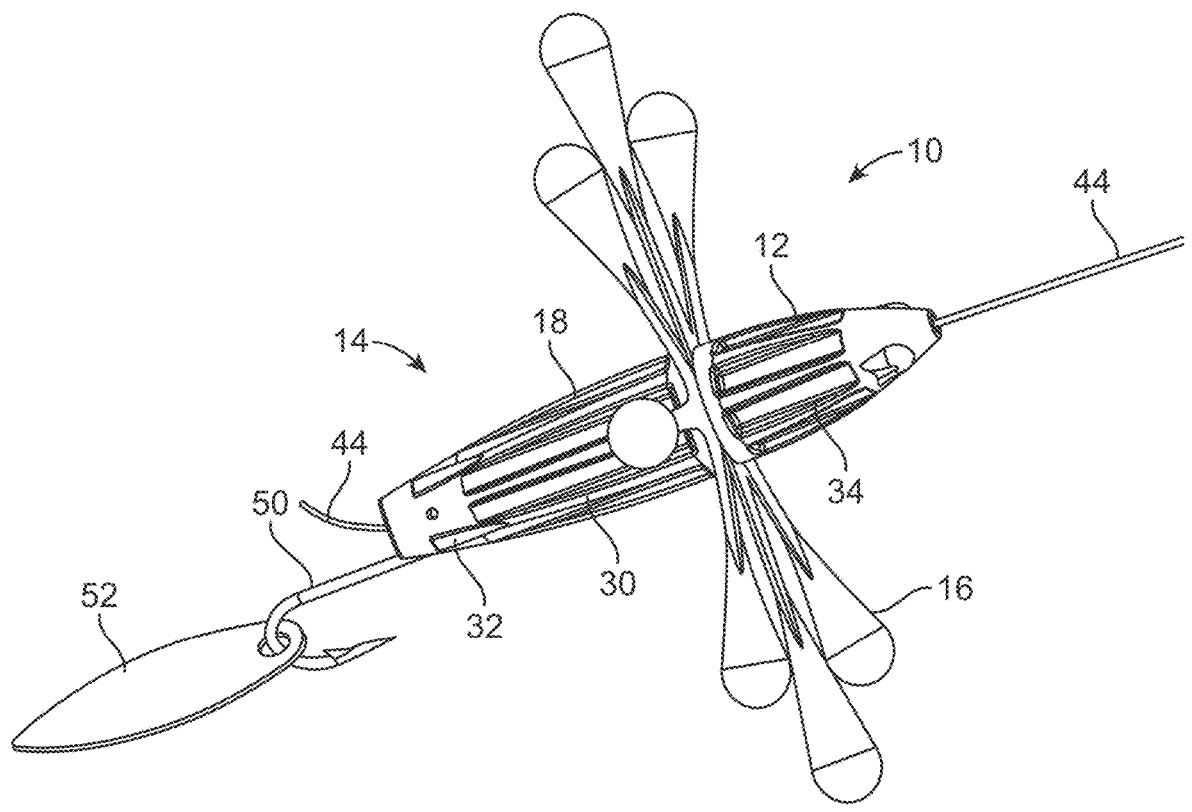
FIG. 6 exemplarily illustrates a perspective view of the fishing lure of FIG. 1 with a fishing line, according to an embodiment of the present invention.
Figure 7:
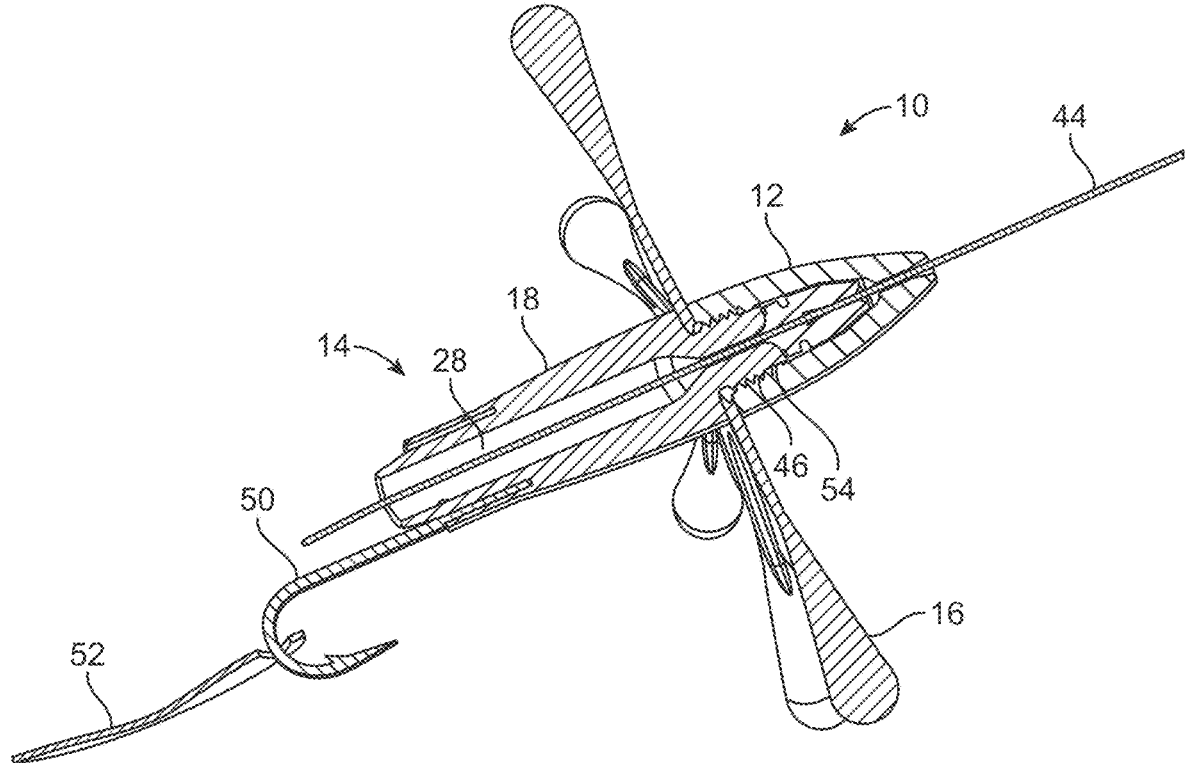
FIG. 7 exemplarily illustrates a cross-sectional view of the fishing lure of FIG. 6 with the fishing line.
Figure 8:
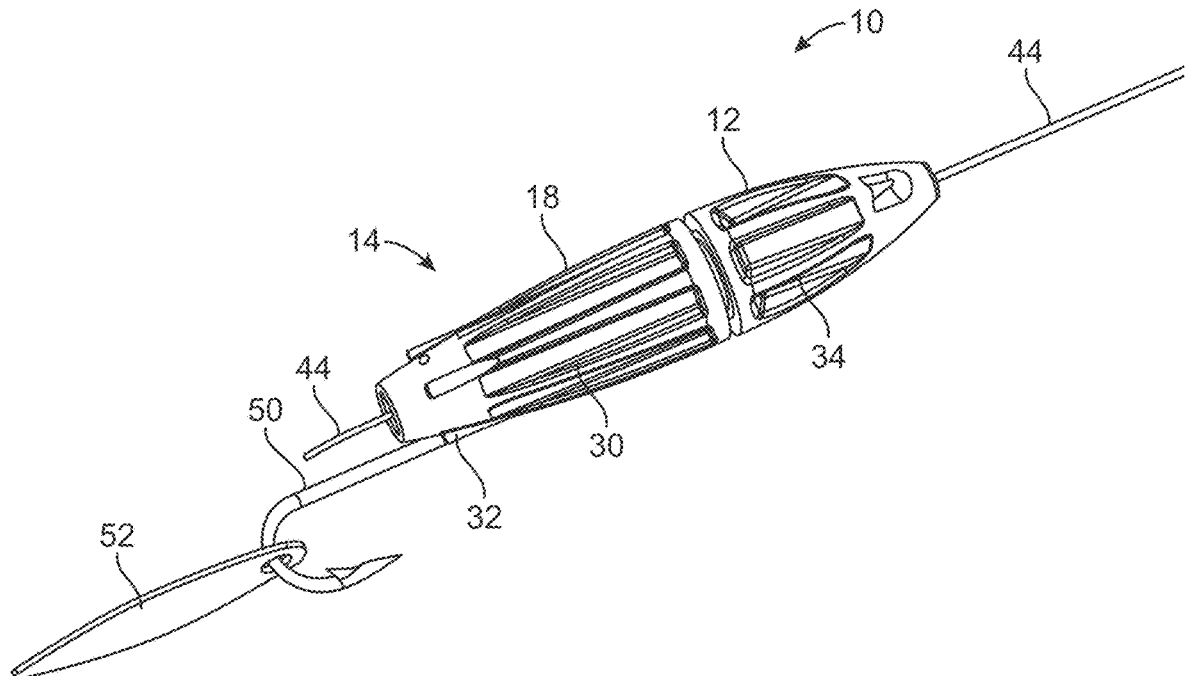
FIG. 8 exemplarily illustrates a perspective view of the fishing lure of FIG. 1 without the weed guard.
Figure 9:
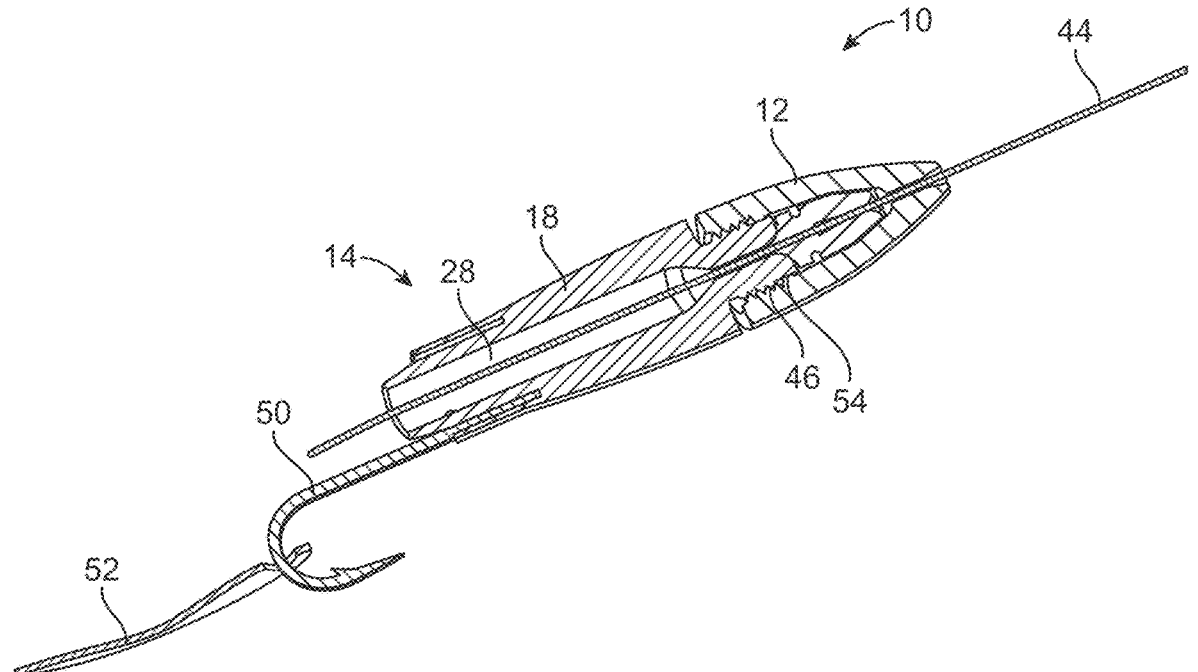
FIG. 9 exemplarily illustrates a cross-sectional view of the fishing lure of FIG. in 8 without the weed guard.

Referring to FIG. 6 and FIG. 8, the fishing hook structure further comprises one or more fishing hooks 50. The hook 50 is received within the sleeve 32. The hook 50 further includes one or more bait accessories 52 to attract the fish. The jaw portion 56 is configured to move from the open configuration to a closed configuration, when the head 12 screwed over the neck 20 presses the jaws 22 towards the axis of the body 18, which clenches the fishing line 44 passing therethrough, thereby fastening the fishing line 44 to the fishing lure 10. The first ridges 30 and the second ridges 34 are configured to provide friction and assist to easily screw the head 12 to the body structure 14.

In one embodiment, the fishing lure 10 is made of polycarbonate plastic. In another embodiment, the fishing lure 10 may be made of any suitable material or composition such as wood, plastic, silicone, rubber, metal, cork, carbon fiber, and other suitable materials. The fishing lure shown in the figures is meant to be an example of a fishing accessory and does not limit the fishing lure to that specifically shown fishing accessory. For example, a fishing lure shown could be replaced with a lure or bobber of different sizes, shapes (e.g. spherical, oblong, teardrop, football, or irregular), or materials (balloon, hollow spherical plastic, polystyrene, cork, foam, yarn, neoprene, silicone, or other floating material). Alternatively, the fishing lure could be replaced by a weight. Weights may be, for example, magnets, metal (e.g. lead), sand, or any material that would sink in water.

In one embodiment, the fishing lure 10 may be configured so that the weed guard 16 can move, rotate, or flex between a relaxed configuration and a tensioned configuration. The weed guard 16 may be configured, or its attachment to the body may be configured, such that the end of the weed guard 16 not connected to the body does not fully enter into the at least partially open volume when the weed guard 16 is in the relaxed configuration. In one embodiment, that end of the weed guard 16 may optionally be able to enter into the open volume when the weed guard 16 is in a tensioned configuration, though it may also be prevented from being able to enter into that volume, such as by limitations in its own flexion, rotation, connection to the head, or by features which prevent such movement, such as by the hook itself. The weed guard 16 may be unitary, may be made of multiple components, may be entirely flexible, or may contain at least one flexible component. The weed guard 16 may be made of a variety of different sheet materials rolled or formed into a cone or may be injection molded as a thin-walled plastic element. In a preferred embodiment, the weed guard 16 is made of a plastic or plastic film. Other suitable materials include silicone alloys, magnesium alloys, coated paper products, lead, iron, steel, and brass. Ideally this material will be water resistant.

Figure 10:
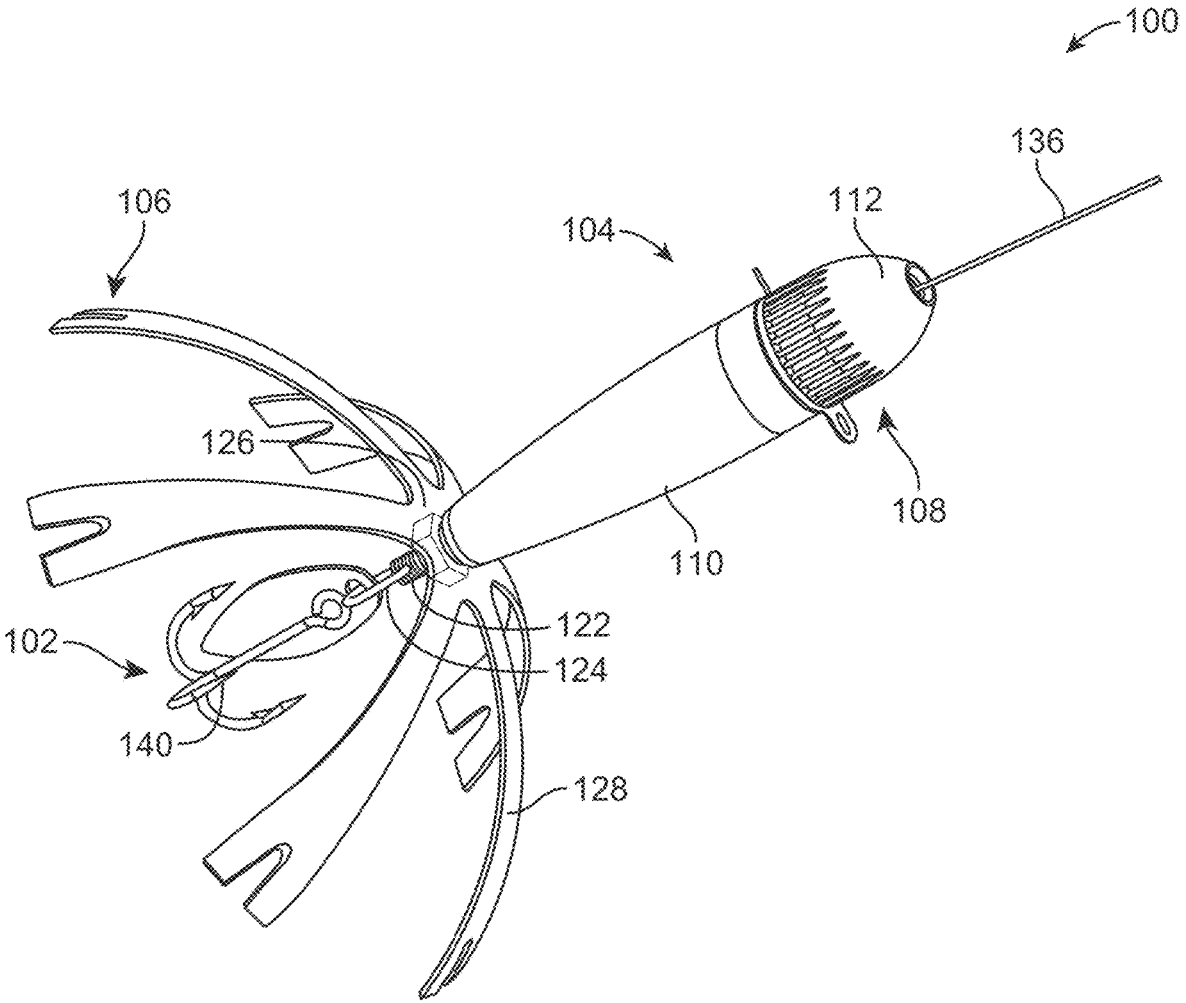
FIG. 10 exemplarily illustrates a perspective view of a fishing lure according to an embodiment of the present invention.

The following part of the description refers to the explanation of FIG. 10 to FIG. 20. The explanation of FIG. 10 to FIG. 20 has some of the terms same as that of FIG. 1 to FIG. 9. While reading the following part of the description, FIG. 10 to FIG. 20 shall be referred. The present invention discloses a fishing lure with a fishing line attachment structure for providing a user with the ability to attach the fishing line relatively easily and quickly to the lure without having to tie a knot and without having to utilize additional or intermediate structures. FIG. 10 exemplarily illustrates a perspective view of a fishing lure 100 according to an embodiment of the present invention. Referring to FIG. 10, the fishing lure 100 (also referred as lure 100) comprises a fishing hook structure 102, a body structure 104 mounted to the fishing hook structure 102 and a weed guard and bite depth control 106 mounted between the fishing hook structure 102 and the body structure 104. It is to be noted that weed guard and bite depth control 106 is an optional element of the fishing lure 100, and other embodiments of the fishing lure 100 without the weed guard and the bite depth control 106 are well within the ambit of the present invention. A fishing line attachment structure 108 configured on the body structure 104. The body structure 104 comprises a body 110, a neck 114 (shown in FIG. 11) extending from the body 110, and a head 112 locked with the neck 114 while clenching the fishing line 136 therebetween.

The fishing lure 100 may be made of any suitable material or composition such as wood, plastic, silicone, rubber, metal, cork, carbon fiber, and other suitable materials. The fishing lure shown in the figures is meant to be an example of a fishing accessory and does not limit the fishing lure to that specifically shown fishing accessory. For example, a fishing lure shown could be replaced with a lure or bobber of different sizes, shapes (e.g., spherical, oblong, teardrop, football, or irregular), or materials (balloon, hollow spherical plastic, polystyrene, cork, foam, yarn, neoprene, silicone, or other floating material). Alternatively, the fishing lure could be replaced by a weight. Weights may be, for example, magnets, metal (e.g., lead), sand, or any material that would sink in water.

The lure 100 further comprises a first eyelet 122 fixedly coupled to a bottom portion of the body 110 for attaching the fishing hook structure 102 including a hook 140. In one embodiment, a ring 124 is connected to the eyelet 122 such that the ring 124 hangs freely from the eyelet 122. The fishing hook structure 102 is attached to the ring 124 such that the fishing hook structure 102 hangs freely from the ring 124. In one embodiment, the fishing hook structure 102 is a treble hook having at least three legs. The lure 100 further comprises the weed guard and bite depth control 106 mounted between the fishing hook structure 102 and the body structure 104. The weed guard and the bite depth control 106 includes a central mount 126 and a plurality of legs or finger like projections 126 extending radially or angularly from the central mount 126. In one embodiment, the body 110 may be a neutral or negative buoyancy so as to allow the entire assembly to be fully submerged in the water.

In one embodiment, the fishing lure may be configured so that the weed guard and bite depth control 106 can move, rotate, or flex between a relaxed configuration and a tensioned configuration. The weed guard and bite depth control 106 may be configured, or its attachment to the body may be configured, such that the end of the weed guard not connected to the body does not fully enter into the at least partially open volume when the weed guard is in the relaxed configuration. In one embodiment, that end of the weed guard and bite depth control 106 may optionally be able to enter into the open volume when the weed guard is in a tensioned configuration, though it may also be prevented from being able to enter into that volume, such as by limitations in its own flexion, rotation, connection to the head, or by features which prevent such movement, such as by the hook itself. The weed guard member may be unitary, may be made of multiple components, may be entirely flexible, or may contain at least one flexible component. The weed guard and bite depth control 106 may be made of a variety of different sheet materials rolled or formed into a cone or may be injection molded as a thin-walled plastic element. In a preferred embodiment, the weed guard and bite depth control 106 is made of a plastic or plastic film. Other suitable materials include silicone alloys, magnesium alloys, coated paper products, lead, iron, steel, and brass. Ideally this material will be water resistant. The body 110 may be smooth or textured and may be plain or contain a design.

Figure 11:
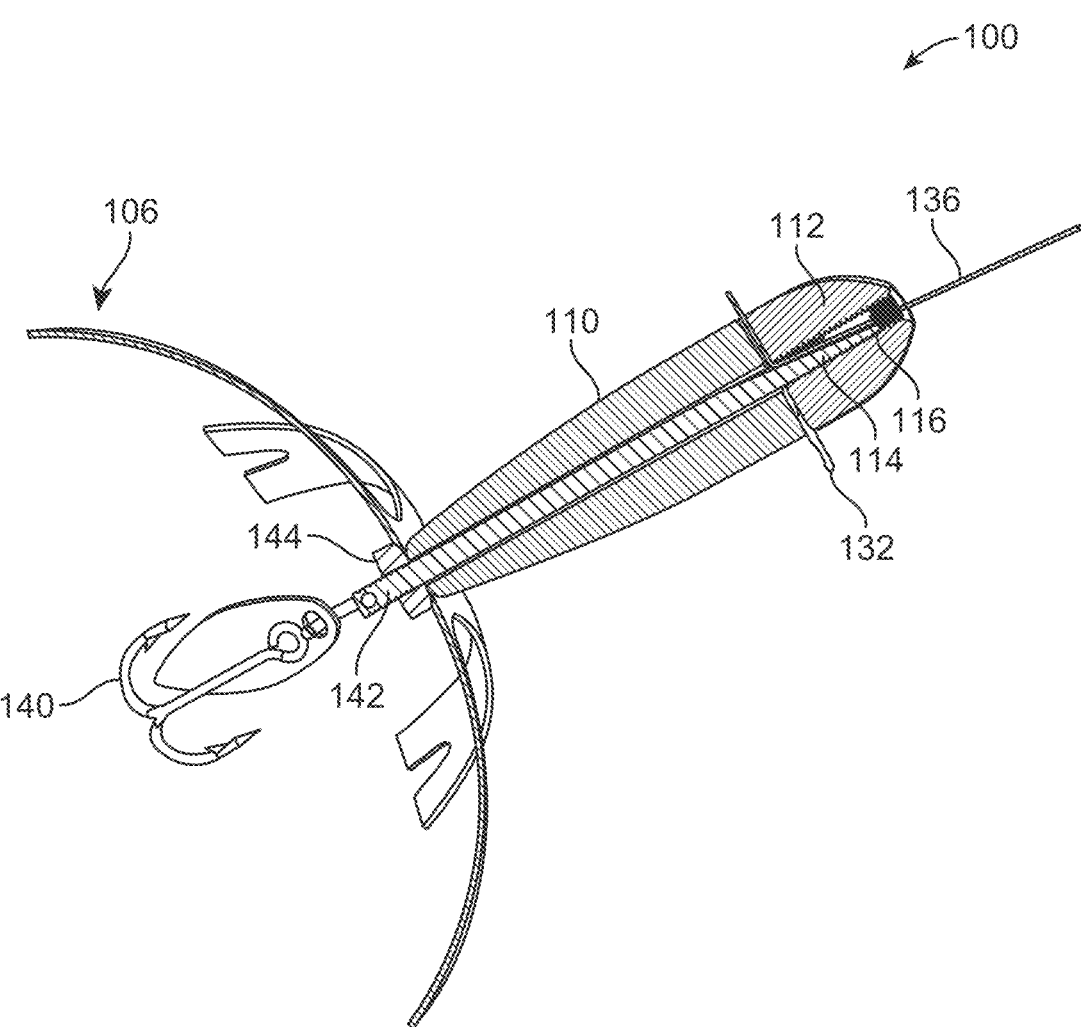
FIG. 11 exemplarily illustrates a cross-sectional view of the fishing lure of FIG. 10.

Referring to FIG. 11, the neck 114 extends from a top flat base or gripping surface of the body 110. The neck 114 is in cylindrical structure having a top side, a bottom side and a sidewall extending between the top and bottom side. The neck 114 further having a slot or port 116. The port 116 formed on the top side of the neck 114 that extends angularly along a proximal length of the axis of the neck 114 and opens at an exterior side of sidewall or bottom side of the neck. In one embodiment, the port 116 opens at an exterior side of the neck 114. In another embodiment, the port 116 extends angularly along a length of the axis of the neck 114. Further, the bottom portion of the body 110 includes an elongated member 142 to which the central mount 126 is slid and secured in position by fastening a nut 144 over the elongated member 142. Further, the lure includes an addition second eyelet 132.

Figure 12:
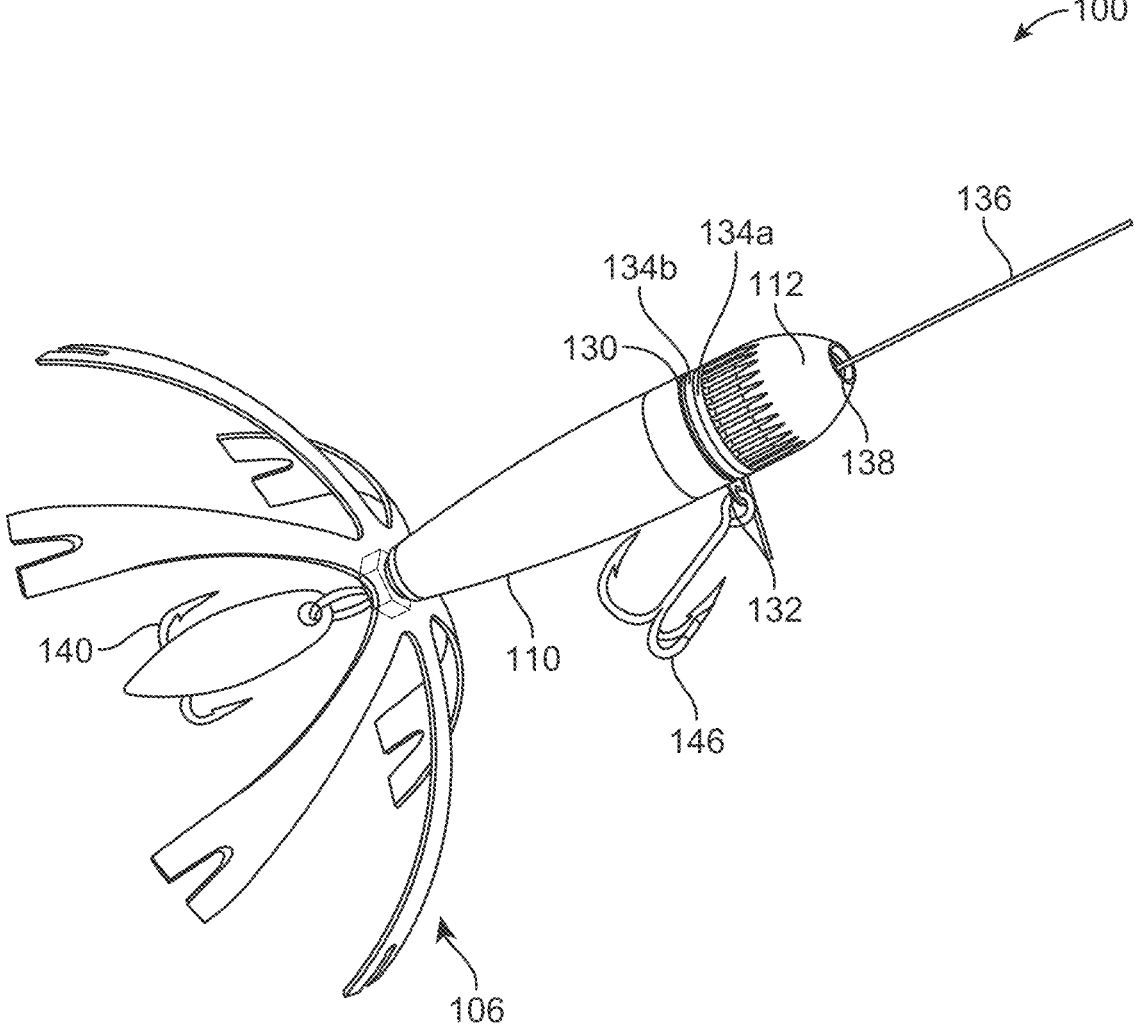
FIG. 12 exemplarily illustrates a perspective view of the fishing lure of FIG. 10 with an additional hook.

Referring to FIG. 12, the lure 100 further comprises an additional ring member 130 disposed at the top portion of the body 110. The second eyelet 132 extends from the additional ring member 130 for securing additional hook 146. The second eyelet 132 is positioned at an angle from the axis of the body 110 and adapted for fastening a fishing line in a jig format to create an alternative swim behavior. The lure 100 may further comprise at least two additional non-metallic members (134a, 134b) between the gripping surface and the head 112. The gripping surface radiating generally outward at an angle from the axis of the neck 114. The at least two non-metallic members (134a, 134b) include a first non-metallic member 134a and a second non-metallic member 134b. In one embodiment, the members (134a, 134b) may be made of material including, but not limited to, rubber and polymer. In another embodiment, the non-metallic members (134a, 134b) are semi-rigid and softer than the fishing line. The lure 100 includes optional weed guard and bite depth control 106. Further, the head 112 includes an aperture 138 for passage of fishing line 136. The fishing line 136 may be of any suitable material, including traditional monofilament, braided line, metal cable, or even semi-rigid wire as may be desired.

Figure 13:
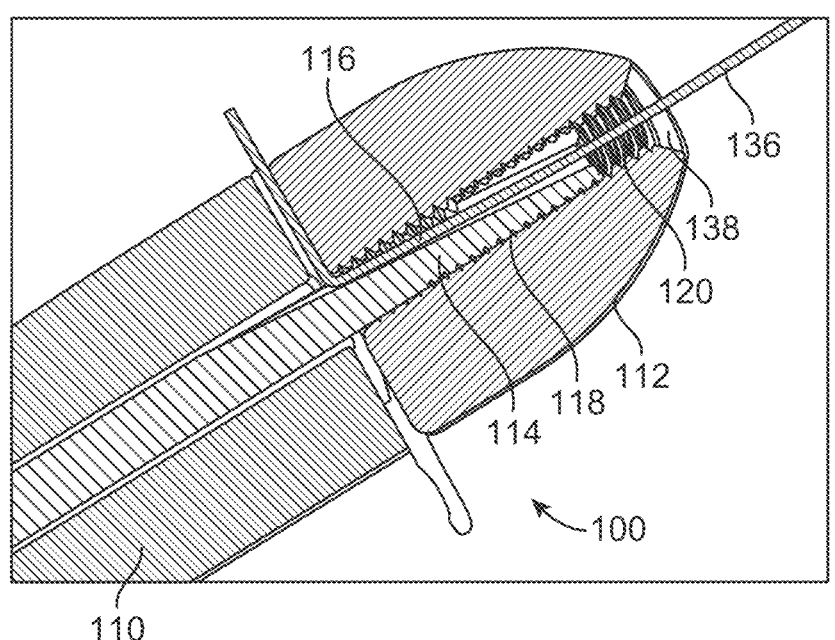
FIG. 13 exemplarily illustrates a cross-sectional view of a fishing line attachment structure of the fishing lure of FIG. 10.

Referring to FIG. 13, the neck 114 includes external circumferential screw threads 118 configured on at least a portion of the longitudinal extent of the neck 114. The external threads 118 may extend along the entire longitudinal extent of the neck 114, or along only a portion of the neck 114. The external threads 118 preferably terminate substantially at the lower or bottom end of the neck 114. The neck 114 further includes the angled port 116. The lure body 110 further comprises the head 112 having internal threads 120 that are adapted to screw and lock with the neck 114. The head 112 further comprises the aperture 138 at a top portion of the head 112. The head 112 allows passage of fishing line 136 from the top portion head 112 to the bottom portion of the head 112. The head 112 defines a first connector and the neck 114 defines a second connector and formed on a top portion of the body 110.

Figure 14:
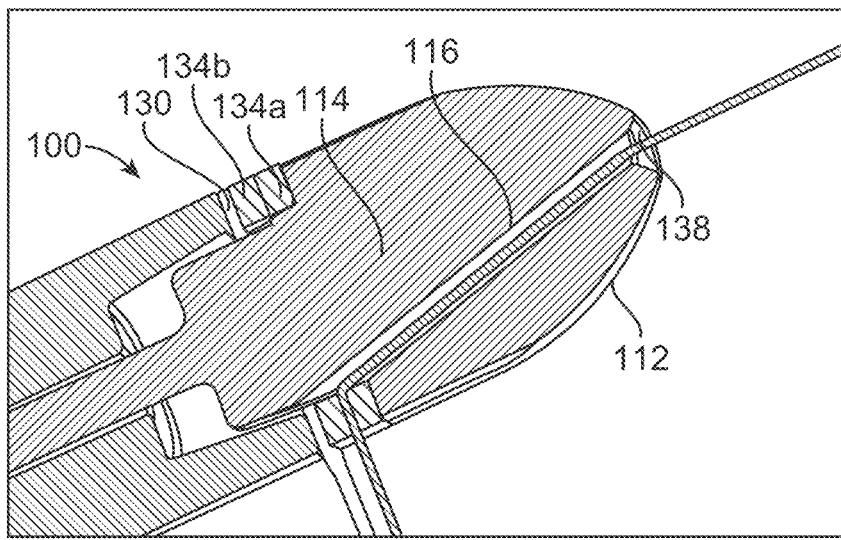
FIG. 14 exemplarily illustrates a cross sectional view of the fishing line attachment structure showing the fishing line secured to the fishing lure of FIG. 10.

Referring to FIG. 13 and FIG. 14, during installation, the fishing line 136 is passed through the aperture 138 of the head 112, and through the port 116 in the neck 114. The fishing line 136 exits from the side of the neck 114. Further, the fishing line 136 is made to pass through the first washer 134a and pulled out from the body structure 104. A portion the fishing line 136 between the non-metallic members (134a, 134b) of the body 110 while the free end of the line 136 hangs freely outside body structure 104. Then the head 112 is screwed to the body 110 which clenches the fishing line 136 between the base of the body 110, neck 114 and the head 112. Optionally, the fishing line 136 may be wrapped around the neck 144 before screwing the head 112 for additional security in securing the line 136. FIG. 14 exemplarily illustrates a cross sectional view of the fishing line attachment structure 108 showing the fishing line 136 secured to the lure 100. Optionally, the head 112 and neck 114 may lock using a snap fit configuration.

The fishing lure 100 with the fishing line attachment structure 108 of FIG. 10 can be configured in number of embodiments (600, 700, 800, 900) as shown in FIG. 15 to FIG. 18. Embodiments (600, 700, 800, 900) have same components and function as of the embodiment 100 with variation in design and hence same term and same numeral is used describing the components of the embodiments (600, 700, 800, 900). The function and method of operation the embodiments (600, 700, 800, 900) can be understood with reference to the fishing lure 100.

Figure 15:
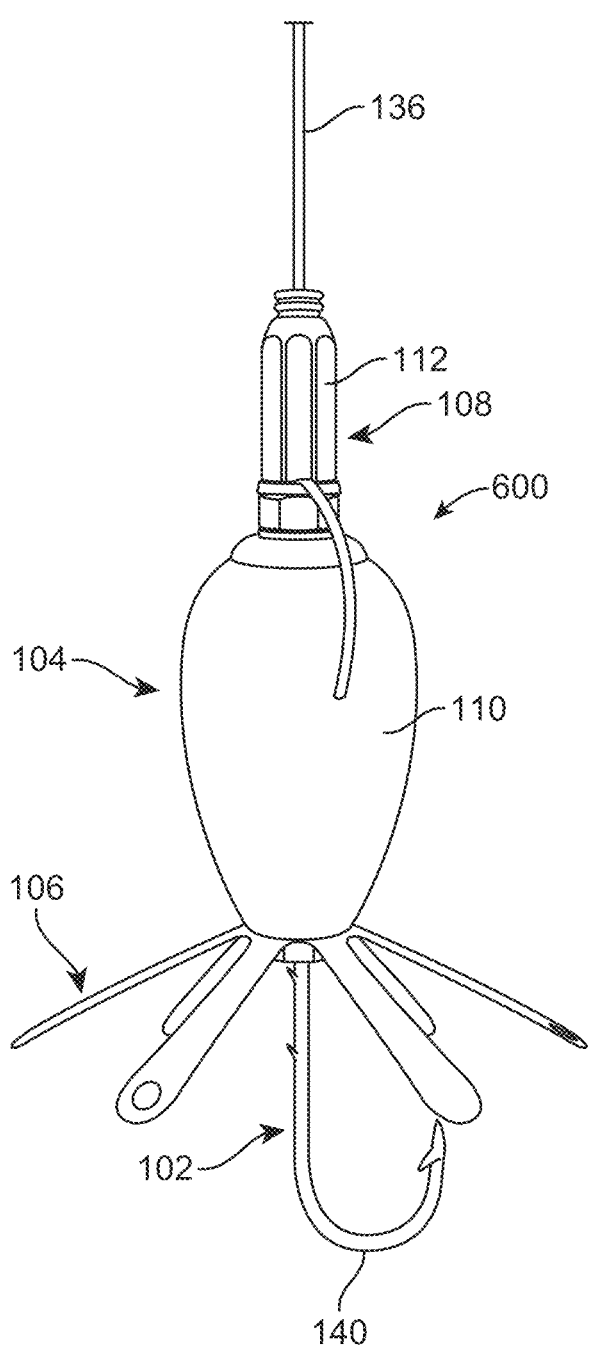
FIG. 15 exemplarily illustrates a fishing lure incorporated with the fishing line attachment structure of FIG. 10, according to yet another embodiment of the present invention.

FIG. 15 exemplarily illustrates a fishing lure 600 incorporated with the fishing line attachment structure 108 of FIG. 10, according to yet another embodiment of the present invention. The lure 600 comprises a fishing hook structure 102 including a hook 140, a body structure 104, a weed guard and bite depth control 106 between the fishing hook structure 102 and body structure 104. The body structure 104 includes a body 110, a neck (not shown) having external threads (not shown) and a head 112 having internal threads (not shown). The neck is configured to receive the fishing line 136 and the head 112 is screwed over the neck thereby fastening the fishing line 136 to the fishing lure 600.

Figure 16:
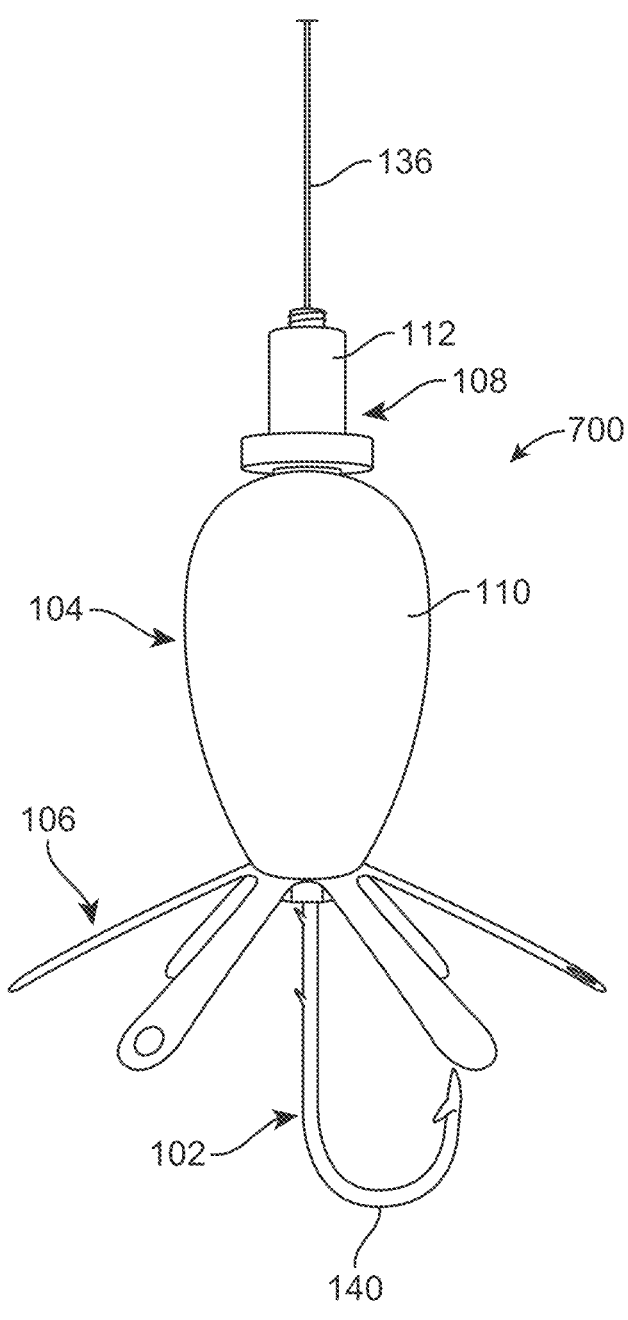
FIG. 16 exemplarily illustrates a fishing lure incorporated with the fishing line attachment structure of FIG. 10, according to yet another embodiment of the present invention.

FIG. 16 exemplarily illustrates a fishing lure 700 incorporated with the fishing line attachment structure 108 of FIG. 10, according to yet another embodiment of the present invention. The lure 700 comprises a fishing hook structure 102 including a hook 140, a body structure 104, a weed guard and bite depth control 106 between the fishing hook structure 102 and body structure 104. The body structure 104 includes a body 110, a neck (not shown) having external threads (not shown) and a head 112 having internal threads (not shown). The neck is configured to receive the fishing line 136 and the head 112 is screwed over the neck thereby fastening the fishing line 136 to the fishing lure 700.

Figures 17, 18:
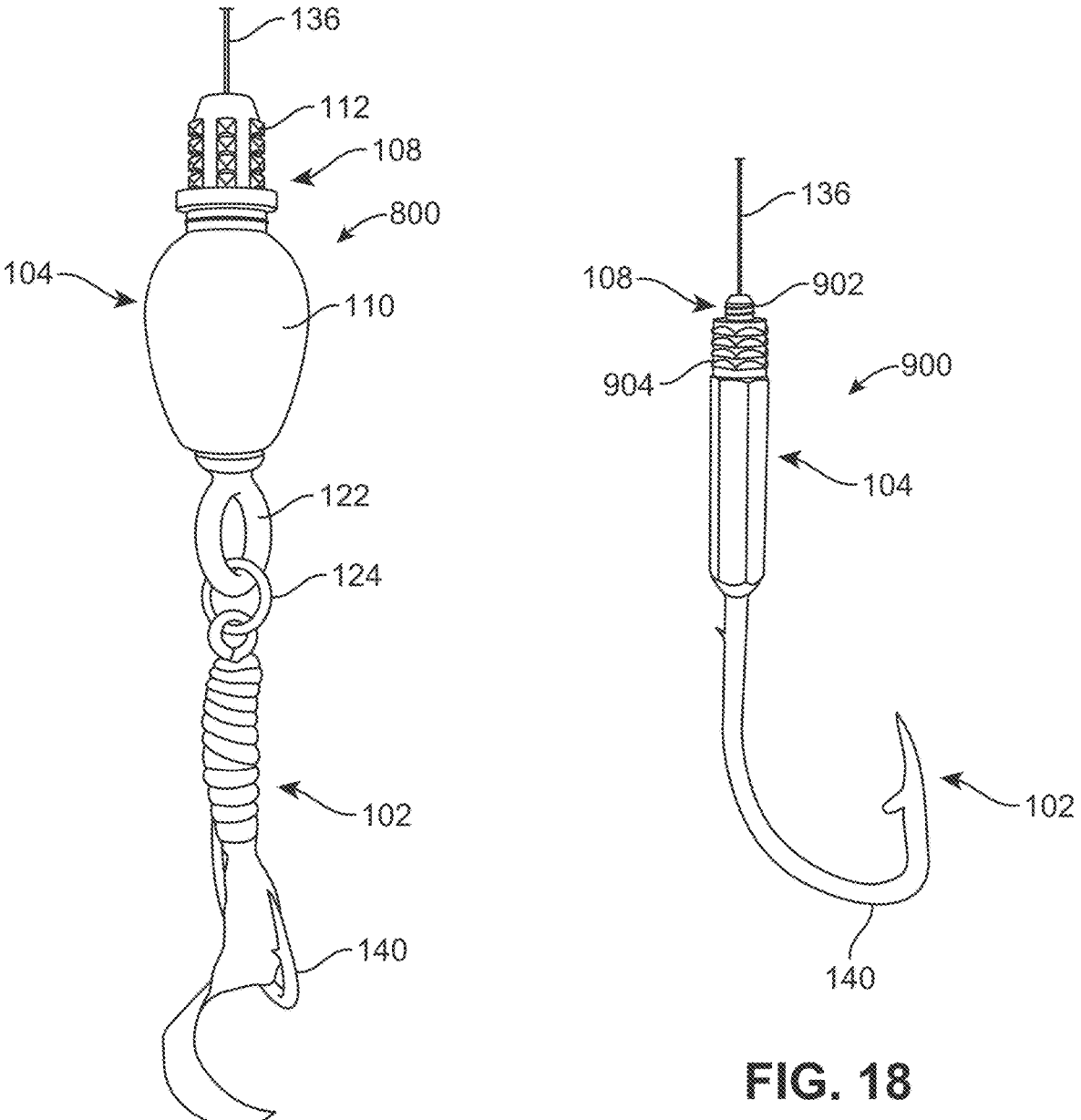
FIG. 17 exemplarily illustrates a fishing lure incorporated with the fishing line attachment structure of FIG. 10, according to yet another embodiment of the present invention.
FIG. 18 exemplarily illustrates a fishing lure incorporated with the fishing line attachment structure of FIG. 10, according to yet another embodiment of the present invention.

FIG. 17 exemplarily illustrates a fishing lure 800 (also referred as lure) incorporated with the fishing line attachment structure 108 of FIG. 10, according to yet another embodiment of the present invention. The lure 800 comprises a fishing hook structure 102 including a hook 140, a body structure 104 mounted to the fishing hook structure 102. The body structure 104 includes a body 110, a neck (not shown) having external threads (shown) and a head 112 having internal threads (not shown). The neck is configured to receive the fishing line 136 and the head 112 is screwed over the neck thereby fastening the fishing line 136 to the lure 800. The bottom portion of the body 110 includes a first eyelet 122, and a ring 124 connected to the eyelet 122. The hook 140 is coupled to the ring 124 to hang freely.

FIG. 18 exemplarily illustrates a fishing lure 900 incorporated with the fishing line attachment structure 108 of FIG. 10, according to yet another embodiment of the present invention. The lure 900 comprises a body structure 104 and a fishing hook structure 102 mounted to the body structure 104. The fishing hook structure 102 including a hook 140. The body structure 104 includes a cylindrical member 902 having external threads and a lure body member 904 having internal threads (not shown). The lure body member 904 is configured to receive the fishing line 136 and the cylindrical member 902 is screwed over the lure body member 904 thereby fastening the fishing line 136 to the lure 900.

Figure 19:
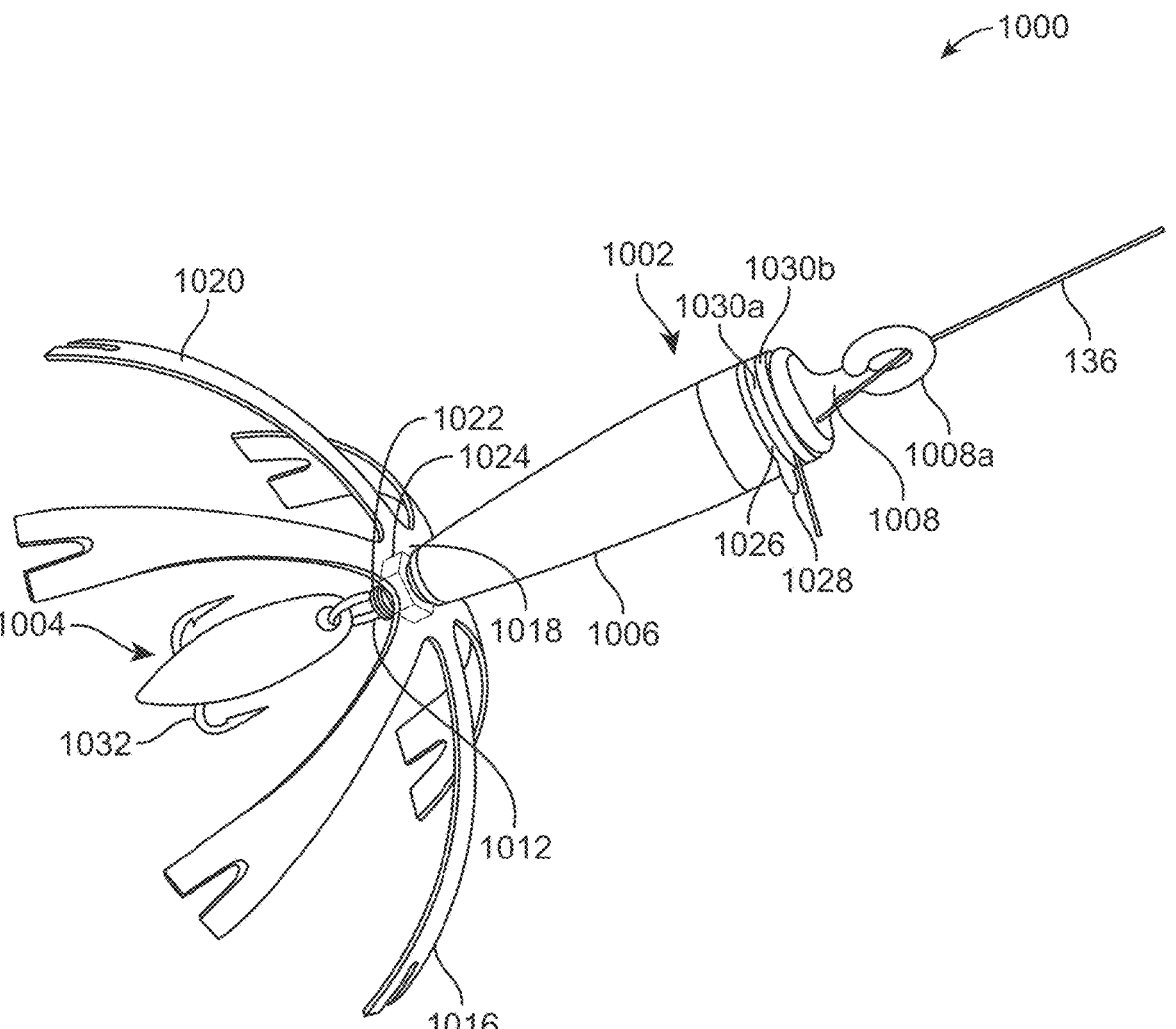
FIG. 19 exemplarily illustrates a perspective view of a fishing lure according to yet another embodiment of the present invention.

FIG. 19 exemplarily illustrates a perspective view of a fishing lure 1000 according to another embodiment of the present invention. The lure 1000 comprises a body structure 1002 having a body 1006, a shaft (not shown) extending from the body 1006 and a head 1008 to lock with the shaft. The shaft defines the first connector and the head 1008 defines the second connector. The first connector and the second connector are formed on a top portion of the body 1006. The shaft and head 1008 define a fishing line attachment structure.

The lure 1000 comprises a first eyelet 1012 fixedly coupled to a bottom portion of the body 1006 for attaching a fishing hook structure 1004. The fishing hook structure 1004 includes a hook 1032. The fishing hook structure 1004 is attached to the first eyelet 1012 such that the fishing hook structure 1004 hangs freely from the first eyelet 1012. In one embodiment, the fishing hook structure 1004 is a treble hook having at least three legs. The lure 1000 further comprises a weed guard and bite depth control 1016 mounted between the fishing hook structure 1004 and the body structure 1002. The weed guard and bite depth control 1016 includes a central mount 1018 and a plurality of legs or fingerlike projections 1020 extend radially or angularly from the axis of the body 1006. The bottom portion of the body 1006 includes an elongated member 1022 to which the central mount 1018 is slid and secured in position by fastening a nut 1024 over the elongated member 1022. The top portion of the body 1006 further comprises a ring member 1026 disposed over the shaft includes a second eyelet 1028, and the second eyelet 1028 is adapted for fastening an additional second hook structure (not shown). The second eyelet 1028 is positioned at an angle from the axis of the body 1006 and adapted for fastening a fishing line in a jig format to create an alternative swim behavior. The body 1006 further comprises at least two non-metallic members (1030a, 1030b) disposed above the ring member 1026. In one embodiment, the non-metallic members (1030a, 1030b) may be made of material including, but not limited to, rubber and polymer.

Further, a proximal eyelet 1008a is disposed at a top portion of the head 1008. During installation, the fishing line 136 is passed through the proximal eyelet 1008a and loop around the shaft of the body 1006 and between the non-metallic members (1030a, 1030b) before tightening and locking the head 1008 to the shaft. Thereby, the fishing line 136 is clenched between the non-metallic members (1030a, 1030b) on locking the head 1008 to the shaft of the body 1006. In one embodiment, the shaft may include external screw threads and the head 1008 may include internal threads. The internal threads of the head 1008 may screw and lock with the external threads over the shaft.

Figure 20:
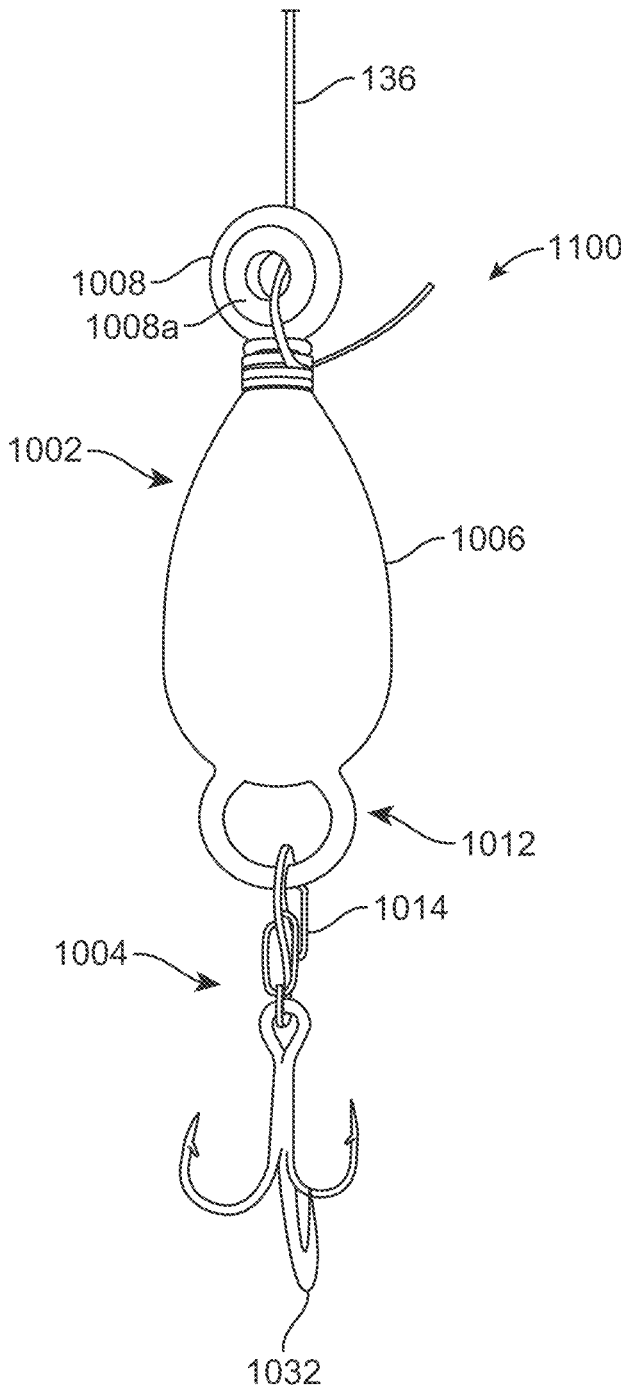
FIG. 20 exemplarily illustrates a fishing lure incorporated with the fishing line attachment structure of FIG. 19, according to yet another embodiment of the present invention.

The fishing lure 1000 with the fishing line attachment structure of FIG. 19 can be configured in number of embodiments. One of the embodiments 1100 is shown in FIG. 20. Embodiment 1100 have same components and function as of the embodiment 1000 with variation in design and hence same term and same numeral is used describing the components of the embodiment 1100. The function and method of operation the embodiment 1100 can be understood with reference to the fishing lure 1000.

FIG. 20 exemplarily illustrates a fishing lure 1100 incorporated with the fishing line attachment structure of FIG. 19, according to yet another embodiment of the present invention. The lure 1100 comprises a body structure 1002 having a body 1006, a shaft extending from the body 1006 and a head 1008 to lock with the shaft. The shaft defines the first connector and the head 1008 defines the second connector. The first connector and the second connector are formed on a top portion of the body 1006.

The lure 1100 comprises a first eyelet 1012 fixedly coupled to a bottom portion of the body 1006 for attaching the fishing hook structure 1004. In one embodiment, a ring 1014 is connected to the first eyelet 1012 such that the ring 1014 hangs freely from the first eyelet 1012. The fishing hook structure 1004 is attached to the ring 1014 such that the fishing hook structure 1004 hangs freely from the ring 1014. The fishing hook structure 1004 includes a hook 1032. In one embodiment, the fishing hook structure 1004 is a treble hook having at least three legs.

The fishing line attachment assembly described with respect to FIG. 1 to FIG. 9 could be configured to embodiments described with respect to FIG. 10 to FIG. 20. The fishing line attachment structure 108 could be replaced with the fishing line attachment assembly described with respect to FIG. 1 to FIG. 9. Further, the components of the lure 10 may also be configured to the embodiments described with respect to FIG. 10 to FIG. 20.

Figure 21:
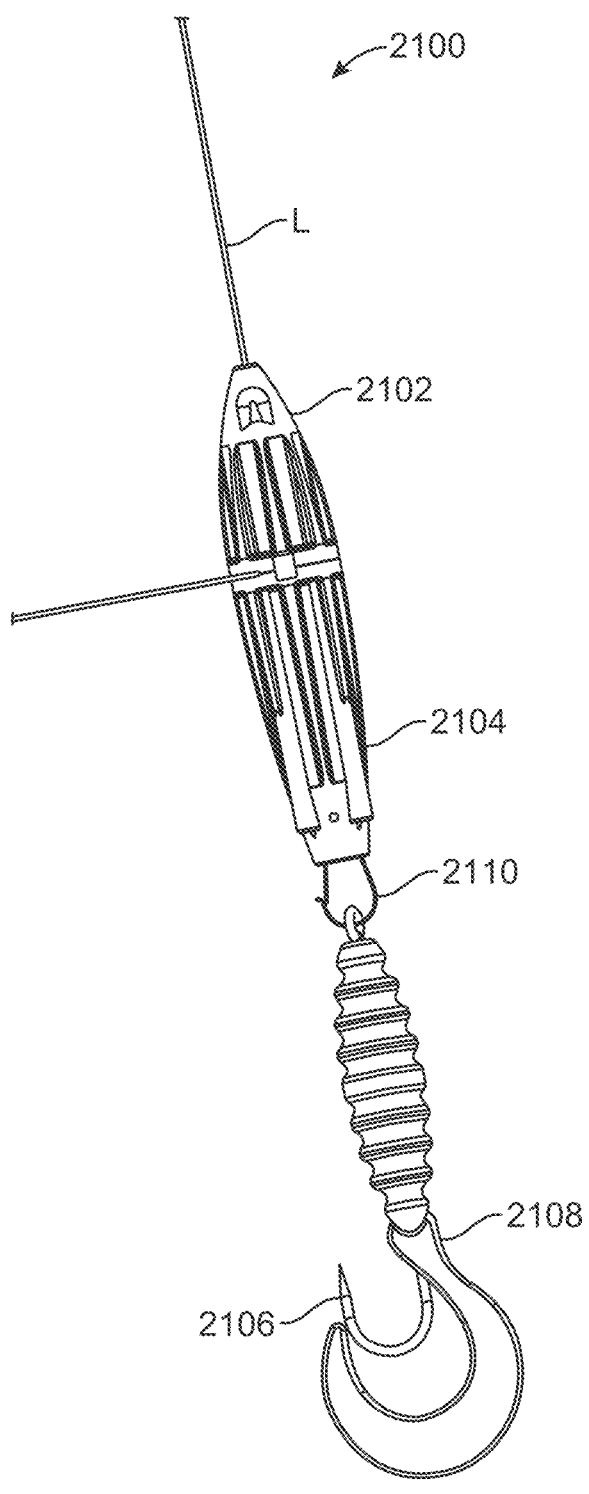
FIG. 21 exemplarily illustrates a perspective view of a fishing lure, according to another embodiment of the present invention.

Referring to FIG. 21, an external perspective view of a fishing lure 2100 in accordance with one embodiment is illustrated. In this embodiment, the lure 2100 comprises a nose portion 2102 and a tail portion 2104 configured to be assembled together (e.g., by threaded engagement). A hook 2106 with a soft plastic bait accessory 2108 is attached to the tail portion 2104 by a snap or connector 2110, though other types of attachment may also be used. As shown, the fishing line L enters from the top of the nose portion 2102, depicting the general orientation in which an angler might hold or lower the lure prior to tightening. In one embodiment, the lure 2100 further comprises one or more wings extending from the nose portion 2102, where the wings are configured to guide the fishing line around a center section of the lure before final tightening.

Figure 22:
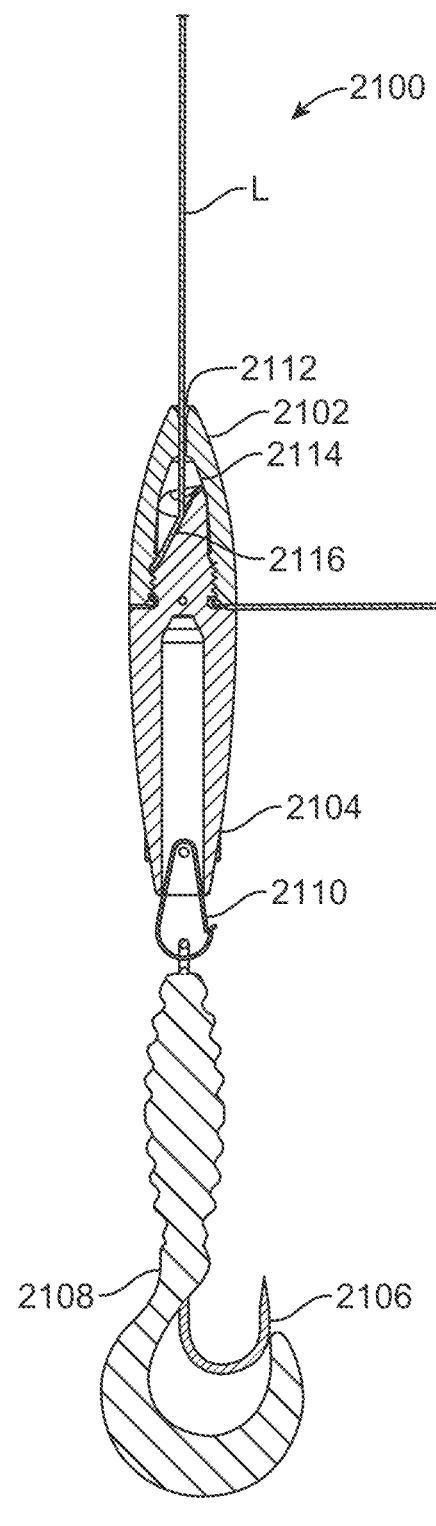
FIG. 22 exemplarily illustrates a cross-sectional view of the fishing lure of FIG. 21, further highlighting internal features for knotless line attachment.

Referring to FIG. 22, a cross-sectional view of the same fishing lure embodiment is depicted, further highlighting internal features for knotless line attachment. In particular, the nose portion 2102 includes a proximal hole 2112 sized to receive the free end of fishing line L. Adjacent the tail portion 2104, a funnel 2114 formed inside the tail portion 2104 aligns with the proximal hole 2112, when the lure 2100 is assembled, for directing the fishing line into a groove 2116. In the illustrated embodiment, the funnel 2114 gradually transitions to the groove 2116, which leads to a gap 2118 (best seen in FIG. 24) formed between the nose portion 2102 and the tail portion 2104. Once the line L passes through the funnel 2114 and groove 2116, it exits at or near the gap 2118, where it can be wrapped or simply positioned for final clamping. Wrapping the line L once or twice on the tail portion 2104 allows for a more secure grip.

Figure 23:
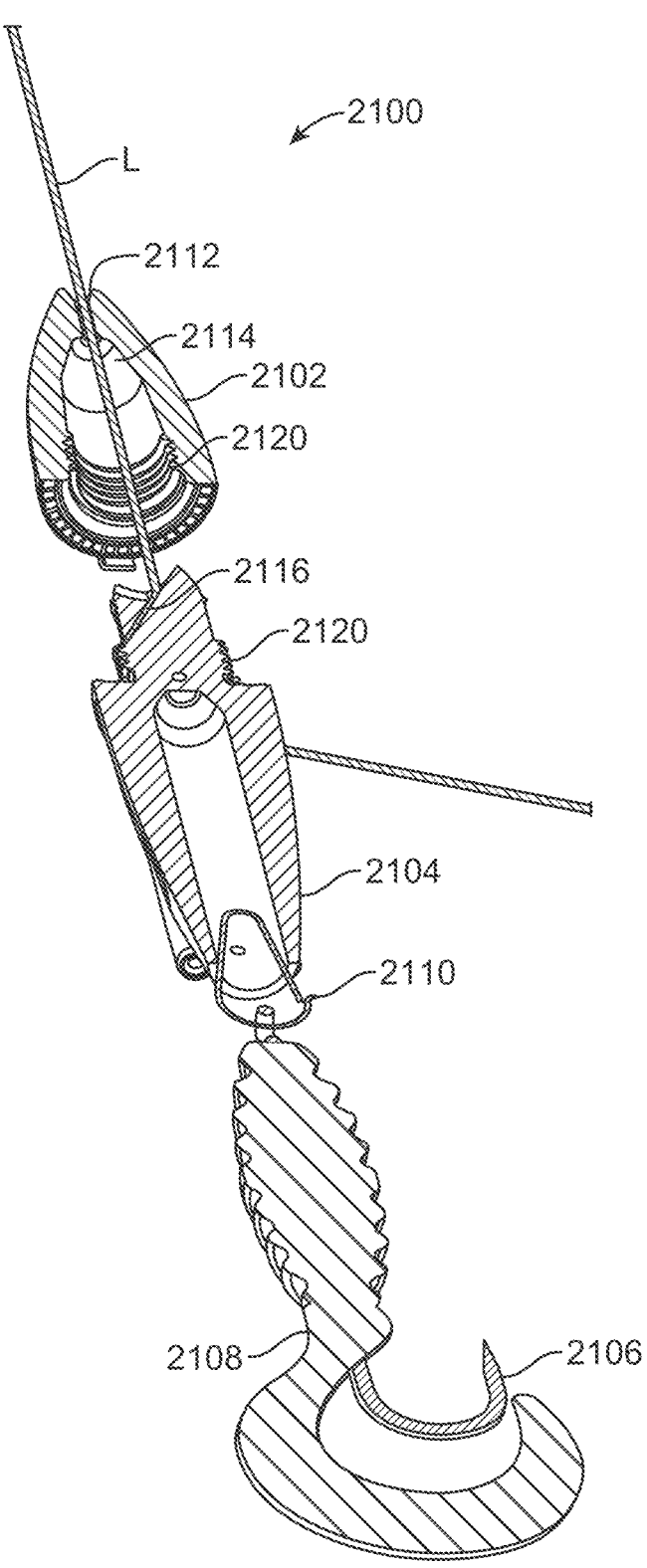
FIG. 23 exemplarily illustrates a partially cut-away, angled perspective of the fishing lure of FIG. 21, with the nose portion pivoted slightly from the tail portion to better reveal the internal path of the fishing line.

Now referring to FIG. 23, a partially cut-away, angled perspective of the lure 2100 is shown, with the nose portion 2102 pivoted slightly from the tail portion 2104 to better reveal the internal path of the fishing line L. The funnel 2114 and groove 2116 are visible in cross-section, demonstrating how the line transitions through the lure without requiring an eyelet or separate hardware. In this illustration, the coupling mechanism 2120 (e.g., the threaded interface between the nose portion 2102 and the tail portion 2104) is loosened so that the internal components can be better seen. When the user rotates the nose portion 2102 in a first direction relative to the tail portion 2104, the coupling mechanism 2120 tightens, clamping the fishing line L between opposing surfaces (including radial grippers if provided). Conversely, rotating in the opposite direction releases the line for easy removal or adjustment.

Figure 24:
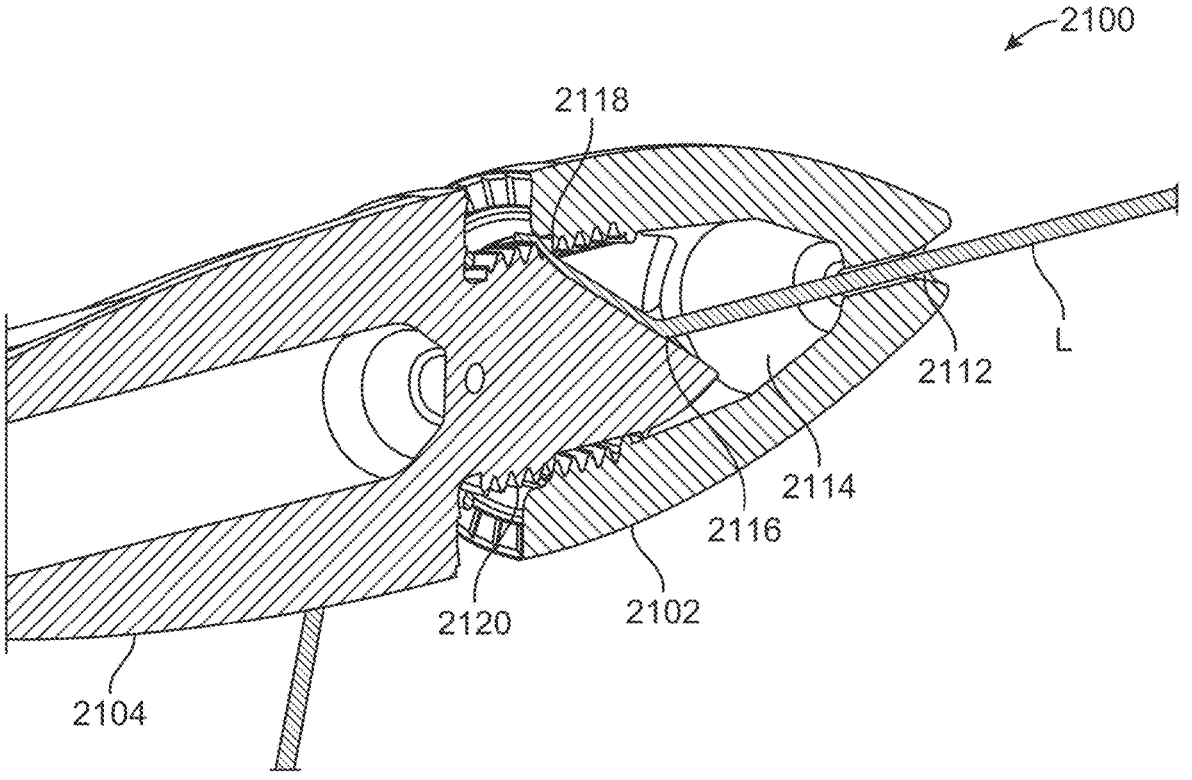
FIG. 24 exemplarily illustrates an enlarged cross-sectional detail of the nose-to-tail interface, focusing on the gap that is formed when the nose portion and tail portion are assembled.

FIG. 24 is an enlarged cross-sectional detail of the nose-to-tail interface, focusing on the gap 2118 that is formed when the nose portion 2102 and tail portion 2104 are assembled. In this illustration, the line L has already been guided from the proximal hole 2112 through the funnel 2114 and groove 2116. The coupling mechanism 2120 facilitates the pressing inward of the nose portion 2102 as the nose portion 2102 is threaded or otherwise moved toward the tail portion 2104. This action pinches or clamps the fishing line L, allowing the lure to be used without tying a traditional fishing knot.

Figure 25:
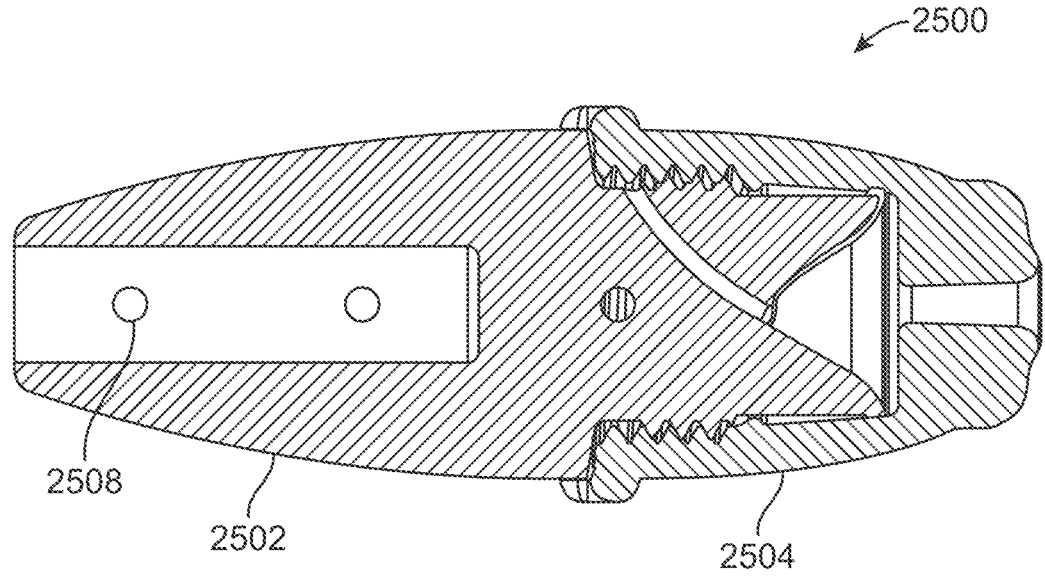
FIG. 25 exemplarily illustrates a partial cross-sectional side view of a fishing lure, according to another embodiment of the present invention, wherein the fishing lure is a smaller version of the lure of FIG. 21 utilizing the same operational principle.

Referring first to FIG. 25, a partial cross-sectional side view of a fishing lure 2500 is shown. The lure 2500 is a smaller version of the lure 2100 utilizing the same operational principle. The lure 2500 includes a tail portion 2502 (on the left side in the figure) and a nose portion 2504 (on the right side). In this embodiment, the nose portion 2504 is partially threaded or otherwise configured to move relative to the tail portion 2502, thereby clamping a fishing line (not shown) when assembled. In FIG. 25, the nose portion 2504 is shown in a relatively closed or tightened position. A fastening aperture 2508 (e.g., for a hook attachment) is shown on the tail portion 2502, although alternate locations or connector types may be used depending on design preferences.

Figure 26:
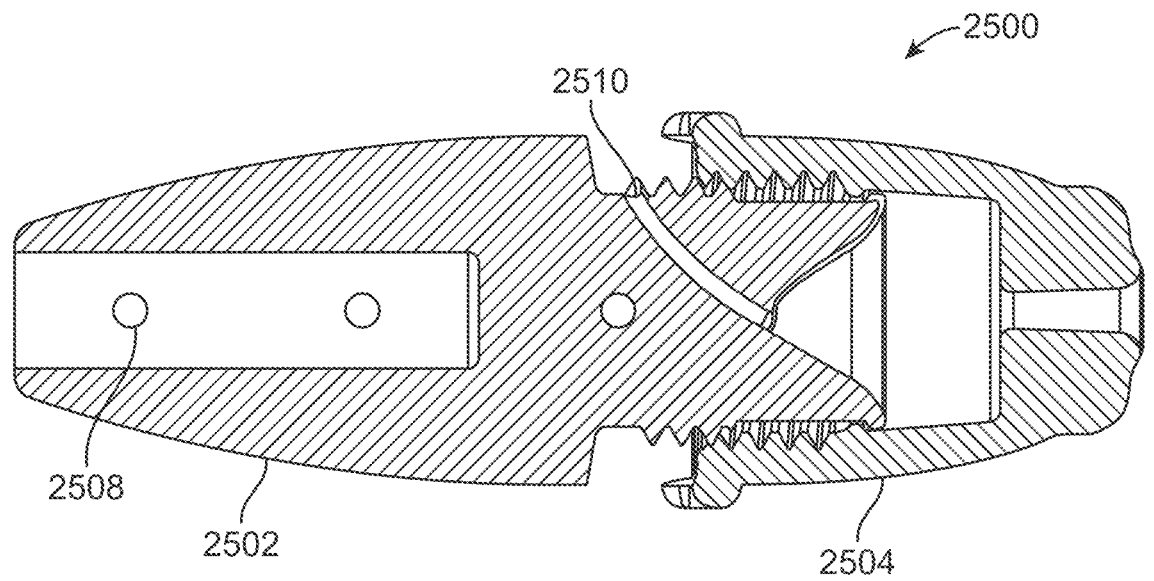
FIG. 26 exemplarily illustrates the fishing lure of FIG. 25 in a slightly loosened state, wherein the nose portion has been moved axially away from the tail portion.

Turning to FIG. 26, the same lure 2500 is depicted in a slightly loosened state, wherein the nose portion 2504 has been moved axially away from the tail portion 2502. The space between the nose portion 2504 and the tail portion 2502 forms a gap 2510 (best appreciated when the lure is partially disassembled), through which the fishing line ultimately exits after passing along an internal funnel and groove. Once the nose portion 2504 is again tightened, the nose portion 2504 presses inward to secure the line, thereby achieving knotless attachment.

Figure 27:
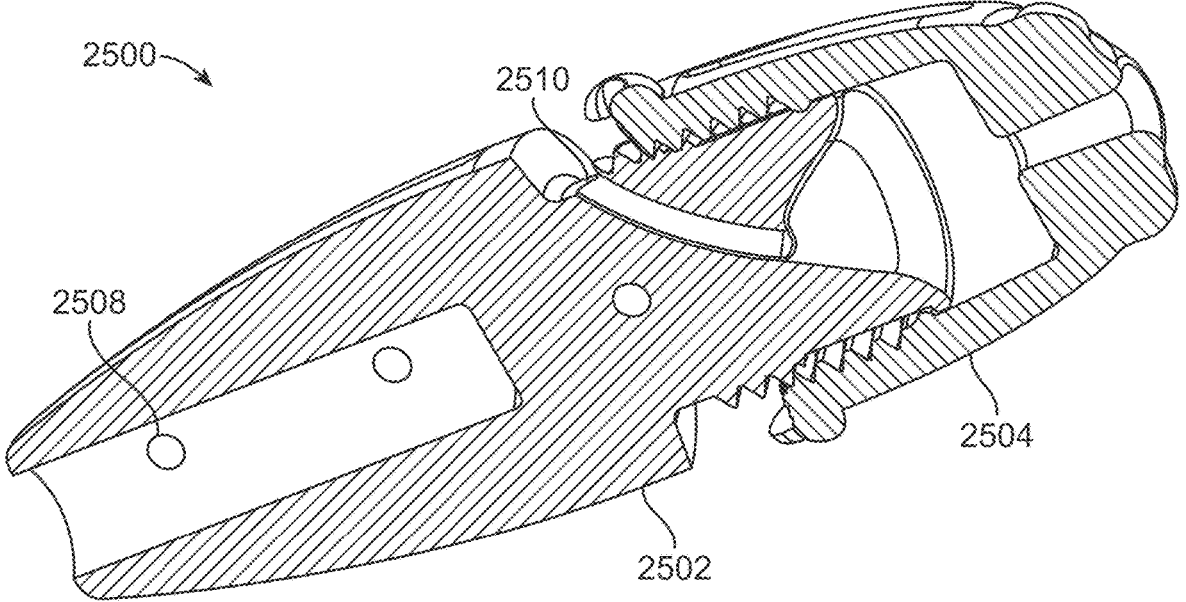
FIG. 27 exemplarily illustrates a perspective cross-sectional view of the fishing lure of FIG. 25, further highlighting how the nose portion and tail portion fit together and clamp the fishing line.

In FIG. 27, a perspective cross-section further highlights how the nose portion 2504 and tail portion 2502 fit together and clamp the line. In some variations, the nose portion 2504 may include internal threads, while the tail portion 2502 may have external threads, or vice versa, thereby providing a coupling mechanism that locks or unlocks by rotational movement.

Figure 28:
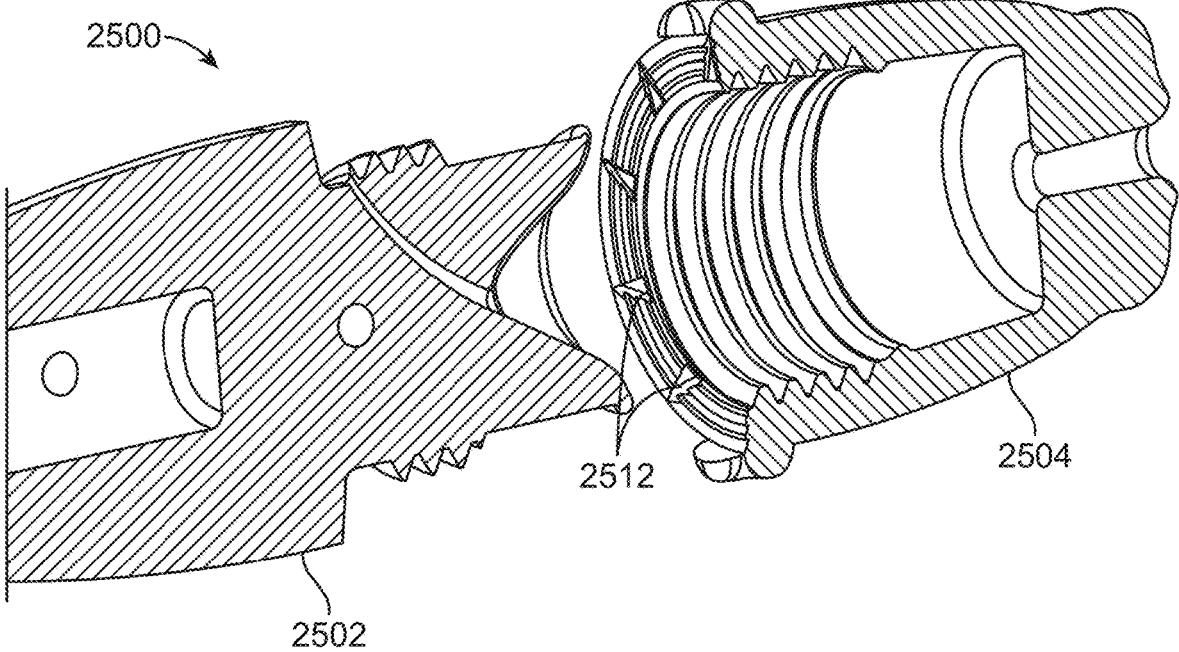
FIG. 28 exemplarily illustrates a partial cross-sectional perspective view of the fishing lure of FIG. 25 in a partially disassembled state.

FIG. 28 shows a partial cross-sectional perspective of a fishing lure 2500 in a partially disassembled state. The lure 2500 includes a tail portion 2502 (on the left) and a nose portion 2504 (on the right). In this embodiment, the nose portion 2504 is partially threaded or otherwise configured to move relative to the tail portion 2502, thereby clamping a fishing line (not shown) when assembled. The nose portion 2504 includes pointed protrusions 2512 (or "teeth") at its inner rim. When the nose portion 2504 is advanced over the tail portion 2502's threaded region, these protrusions 2512 press against the fishing line, together with matching surfaces on the tail portion 2502, to secure the line without requiring a knot.

Figure 29:
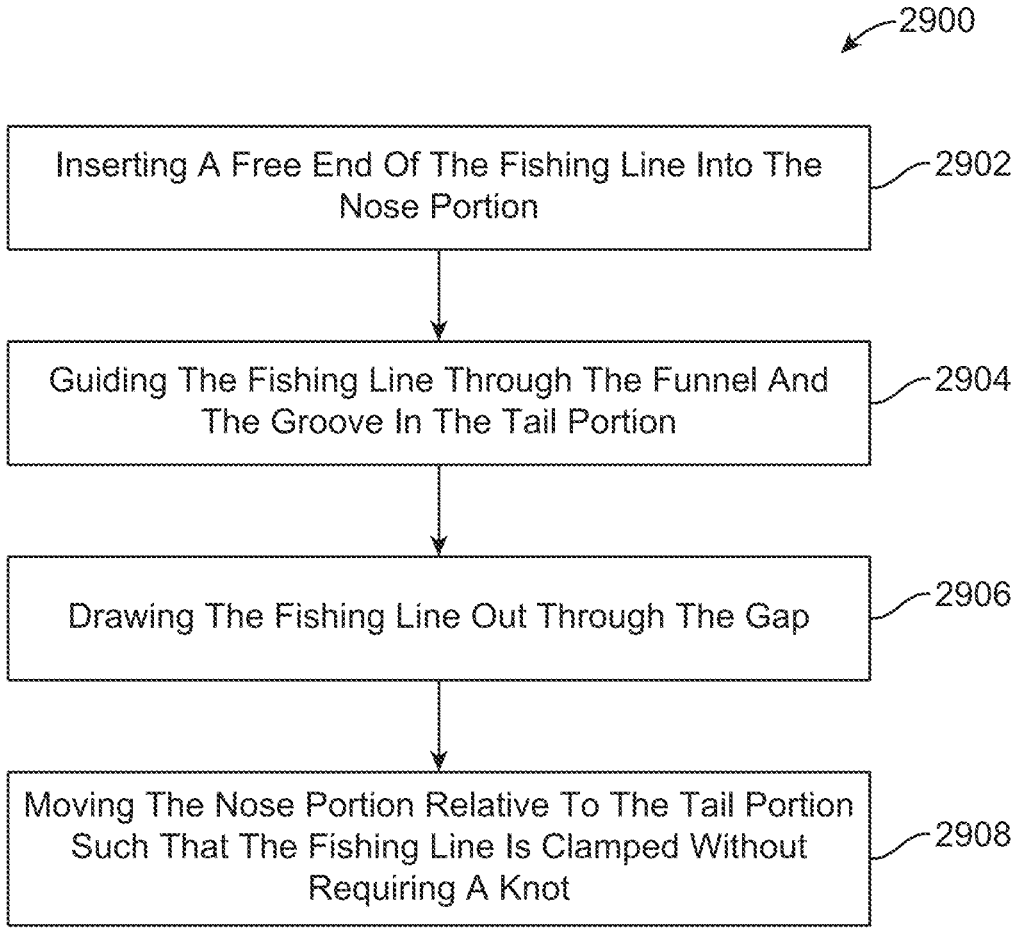
FIG. 29 exemplarily illustrates a flow diagram representing a method for attaching a fishing line to a fishing lure without tying a knot, according to an embodiment of the present invention.

Referring to FIG. 29, a flow diagram illustrates a method 2900 for attaching a fishing line to a fishing lure without tying a knot. In the illustrated embodiment, the lure includes a nose portion and a tail portion configured to be assembled together, with a funnel in the tail portion and groove in the tail portion leading to a gap that is defined between the nose portion and the tail portion when assembled.

At step 2902, a free end of the fishing line is inserted into the nose portion. In practice, the angler holds the lure in one hand and threads the fishing line through a proximal hole or opening at the nose portion. At step 2904, the fishing line is guided through the funnel formed in the tail portion towards the groove formed in the tail portion. The funnel is sized and shaped to capture the fishing line easily, directing it into the groove, which in turn routes the line toward the gap. At step 2906, the fishing line is drawn out through the gap. The gap is formed only when the nose portion and tail portion are brought together (e.g., via threads or another coupling). Once the line emerges, the angler can optionally wrap or position the line around a central threaded section for additional security. Finally, at step 2908, the nose portion is moved (e.g., rotated or otherwise advanced) relative to the tail portion, thereby clamping the fishing line without requiring a knot. As the nose portion tightens, it pinches the line between internal gripping surfaces, preventing the line from slipping out under tension.

In one embodiment, the nose portion has a proximal hole sized to receive the fishing line. The proximal hole is dimensioned so that typical fishing lines (monofilament, braided, etc.) can be threaded smoothly. During step 2902, the line is inserted into this proximal hole before entering the funnel.

In one embodiment, the funnel in the tail portion is aligned with the proximal hole in the nose portion when the lure is assembled, thereby directing the fishing line from the nose portion through the funnel and into the groove. This alignment ensures the line naturally follows a path from the nose portion to the gap, minimizing snags.

In one embodiment, the fishing lure includes a coupling mechanism (such as interlocking threads) by which rotation or movement of the nose portion relative to the tail portion clamps the fishing line. During step 2908, the user rotates or slides the nose portion to apply inward pressure on the line, securing it without a knot.

In one embodiment, the method further comprises wrapping the fishing line one or more times around a threaded section or central portion of the tail portion before moving the nose portion to clamp the line. This wrapping step occurs just before or during step 2906 (drawing the line out) or immediately thereafter, providing additional friction and security once the nose portion is tightened.

In one embodiment, the method further comprises engaging the fishing line with radial grippers on the nose portion, thereby preventing the line from slipping back through the funnel and groove prior to final tightening. In such an arrangement, small protrusions or "teeth" on the nose portion catch the line during steps 2904-2906, holding it in place until the user fully tightens at step 2908.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A fishing lure for knotless line attachment, comprising:
   a nose portion and a tail portion configured to be assembled together along a longitudinal axis of the lure;
   a funnel formed in the tail portion;
   a groove extending within the tail portion from the funnel to a gap that is formed between the nose portion and the tail portion when the nose portion and the tail portion are assembled, the groove being configured to receive a fishing line extending from the funnel to the gap;
   a coupling mechanism between the nose portion and the tail portion, the coupling mechanism including mating threaded structures on the nose portion and the tail portion and being adapted to secure the fishing line in the lure without requiring a knot by drawing the nose portion toward the tail portion;
   a proximal opening in the nose portion sized and positioned to receive the fishing line and direct the fishing line toward the funnel in the tail portion;
   one or more wings or fins projecting outwardly from a center section of the tail portion and positioned such that, when the fishing line exits the gap between the nose portion and the tail portion, at least a portion of the fishing line is configured to be wrapped around the center section of the tail portion adjacent the one or more wings or fins; and
   a plurality of radial grippers on the nose portion positioned adjacent the gap and configured such that, when the nose portion is rotated and tightened against the tail portion by the coupling mechanism, the radial grippers engage and clamp at least a portion of the fishing line between the nose portion and the tail portion without requiring a knot in the fishing line.

2. The fishing lure of claim 1, further comprising:
   a hook-receiving region at a distal portion of the tail portion configured to support a hook; and
   a flexible weed guard mounted to the lure and extending past the hook-receiving region, the flexible weed guard being configured to deflect away from the hook-receiving region when contacted by vegetation or debris to reduce snagging while permitting a fish to engage a hook supported at the hook-receiving region.

3. The fishing lure of claim 2, wherein the flexible weed guard comprises a plurality of flexible members extending from a central mount on the lure toward the hook-receiving region and arranged to at least partially cover an opening of the hook-receiving region in a relaxed state of the fishing lure.

4. The fishing lure of claim 2, wherein the flexible weed guard is formed from a polymeric material and is configured such that, when a fish bites the lure, the flexible weed guard deforms to allow the fish to contact and be hooked by the hook supported at the hook-receiving region.

5. The fishing lure according to claim 1, wherein the center section of the tail portion defines a cylindrical body, and the one or more wings or fins extend radially outwardly from the cylindrical body to provide a surface against which the wrapped fishing line can bear when the coupling mechanism is tightened.

6. The fishing lure according to claim 1, wherein the radial grippers comprise a plurality of ridges or projections formed on a surface of the nose portion facing the tail portion, the ridges or projections being oriented radially around the longitudinal axis and configured to indent the fishing line when the nose portion is tightened against the tail portion.

7. A method of attaching a fishing line to a fishing lure without tying a knot, the method comprising:

providing a fishing lure comprising:

a nose portion and a tail portion configured to be assembled together along a longitudinal axis of the lure;

a funnel formed in the tail portion;

a groove extending within the tail portion from the funnel to a gap that is formed between the nose portion and the tail portion when the nose portion and the tail portion are assembled, the groove being configured to receive a fishing line extending from the funnel to the gap;

a coupling mechanism between the nose portion and the tail portion, the coupling mechanism including mating threaded structures on the nose portion and the tail portion;

a proximal opening in the nose portion sized and positioned to receive the fishing line and direct the fishing line toward the funnel in the tail portion;

one or more wings or fins projecting outwardly from a center section of the tail portion; and a plurality of radial grippers on the nose portion positioned adjacent the gap;

inserting a free end of the fishing line through the proximal opening in the nose portion;

advancing the fishing line from the proximal opening into the funnel formed in the tail portion;

directing the fishing line from the funnel into the groove that extends within the tail portion and into the gap between the nose portion and the tail portion;

wrapping at least a portion of the fishing line exiting the gap around the center section of the tail portion adjacent the one or more wings or fins; and tightening the coupling mechanism by rotating the nose portion relative to the tail portion so that the nose portion is drawn toward the tail portion and the plurality of radial grippers engage and clamp the fishing line between the nose portion and the tail portion without tying a knot in the fishing line.

8. The method of claim 7, further comprising:

providing the fishing lure with a hook-receiving region at a distal portion of the tail portion and a flexible weed guard mounted to the lure and extending past the hook-receiving region;

attaching a hook to the hook-receiving region; and retrieving the fishing lure through water such that the flexible weed guard deflects away from vegetation or debris to reduce snagging while permitting a fish to engage the hook attached at the hook-receiving region.

\* \* \* \* \*